(12) United States Patent  
Papadantonakis et al.

(10) Patent No.: US 11,641,326 B2  
(45) Date of Patent: May 2, 2023

(54) SHARED MEMORY MESH FOR SWITCHING

(71) Applicant: Intel Corporation, Santa Clara, CA (US)

(72) Inventors: Karl S. Papadantonakis, Agoura Hills, CA (US); Robert Southworth, Chatsworth, CA (US); Arvind Srinivasan, San Jose, CA (US); Helia A. Naeimi, Santa Clara, CA (US); James E. McCormick, Jr., Fort Collins, CO (US); Jonathan Dama, Encino, CA (US); Ramakrishna Huggahalli, Scottsdale, AZ (US); Roberto Penaranda Cebrian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/549,915

(22) Filed: Aug. 23, 2019

(65) Prior Publication Data

US 2020/0412666 A1     Dec. 31, 2020

Related U.S. Application Data

(60) Provisional application No. 62/868,730, filed on Jun. 28, 2019.

(51) Int. Cl.
   *H04L 49/103*    (2022.01)
   *H04L 47/625*    (2022.01)
   (Continued)

(52) U.S. Cl.
   CPC ........ *H04L 49/103* (2013.01); *H04L 47/6255* (2013.01); *H04L 47/6275* (2013.01);
   (Continued)

(58) Field of Classification Search
   CPC ... H04L 67/101; H04L 67/10; H04L 67/1002; H04L 45/02; H04L 47/70; H04L 49/103;
   (Continued)

(56) References Cited

U.S. PATENT DOCUMENTS 6,278,718 B1 *   8/2001   Eschholz ............. H04J 3/0626  
                                                                                370/503  
6,665,675 B1 *   12/2003   Mitaru .................... H04L 29/06  
(Continued)

FOREIGN PATENT DOCUMENTS

EP           1142219 A1     10/2001

OTHER PUBLICATIONS

Extended European Search Report for Patent Application No. 20164686.6, dated Oct. 1, 2020, 10 pages.
(Continued)

*Primary Examiner* — Raj Jain  
(74) *Attorney, Agent, or Firm* — Compass IP Law PC

(57) ABSTRACT

Examples are described herein that relate to a mesh in a switch fabric. The mesh can include one or more buses that permit operations (e.g., read, write, or responses) to continue in the same direction, drop off to a memory, drop off a bus to permit another operation to use the bus, or receive operations that are changing direction. A latency estimate can be determined at least for operations that drop off from a bus to permit another operation to use the bus or receive and channel operations that are changing direction. An operation with a highest latency estimate (e.g., time of traversing a mesh) can be permitted to use the bus, even causing another operation, that is not to change direction, to drop off the bus and re-enter later.

22 Claims, 19 Drawing Sheets

(51) Int. Cl.
*H04L 47/6275* (2022.01)
*H04L 49/00* (2022.01)
*H04L 67/101* (2022.01)
*H04L 7/10* (2006.01)
*H04L 67/10* (2022.01)

(52) U.S. Cl.
CPC .......... *H04L 49/3027* (2013.01); *H04L 67/10* (2013.01); *H04L 67/101* (2013.01)

(58) Field of Classification Search
CPC ............. H04L 47/6255; H04L 47/6275; H04L 49/3027; H04L 49/25
See application file for complete search history.

(56) References Cited

U.S. PATENT DOCUMENTS

| | | | |
|---|---|---|---|
| 7,536,428 B2* | 5/2009 | Erdogan | G06F 5/10 |
| 8,819,616 B2 | 8/2014 | Philip et al. | |
| 10,257,277 B2* | 4/2019 | Schlapfer | G16H 40/20 |
| 2002/0181503 A1* | 12/2002 | Montgomery, Jr. | |
| | | | H04J 14/0283 |
| | | | 370/468 |
| 2010/0049942 A1 | 2/2010 | Kim et al. | |
| 2015/0006776 A1 | 1/2015 | Liu et al. | |
| 2016/0203025 A1* | 7/2016 | Yao | G06F 9/5088 |
| | | | 718/104 |
| 2017/0063564 A1 | 3/2017 | Kumar et al. | |
| 2017/0063639 A1 | 3/2017 | Raponi et al. | |
| 2018/0063261 A1* | 3/2018 | Moghe | H04W 36/0083 |
| 2020/0412666 A1* | 12/2020 | Papadantonakis | |
| | | | H04L 47/6275 |

OTHER PUBLICATIONS

M. Moadeli, A. Shahrabi, W. Vanderbauwhede, "Analytical Modelling of Communication in the Rectangular Mesh NoC", IEEE 2007 International Conference on Parallel and Distributed Systems, vol. 2, 8 pages.

Marjan Morvarid, Reza Berangi, and Mahmood Fathy, "Dual Path Odd-Even Routing Algorithm for Network on Chips", 3rd International Conference on Computer Modeling and Simulation (ICCMS 2011), pp. V1-57-V1-61, 5 pages.

Michael G. Hluchyj and Mark J. Karol, "Queueing in High-Performance Packet Switching", IEEE Journal on Selected Areas in Communications, vol. 6, No. 9, Dec. 1988, pp. 1587-1597, 11 pages.

Tom R. Halfhill, "Automating Front-End SoC Design With NetSpeed's On-Chip Network IP", The Linley Group, Inc., Mar. 2015, 10 pages.

Yanpei Chen, Rean Griffith, Junda Liu, Randy H. Katz, and Anthony D. Joseph, "Understanding TCP Incast Throughput Collapse in Datacenter Networks", 2009 Proceedings of the 1st ACM Workshop on Research on Enterprise Networking (WREN 2009), 10 pages.

European First Office Action, (EP Exam Report Article 94(3) EPC), for Patent Application No. 20164686.6, dated Nov. 3, 2022, 7 pages.

* cited by examiner

SHARED MEMORY MESH FOR SWITCHING

RELATED APPLICATION

The present application claims the benefit of priority date of U.S. provisional patent application Ser. No. 62/868,730, filed Jun. 28, 2019, the entire disclosure of which is incorporated herein by reference.

TECHNICAL FIELD

Various examples described herein relate to managing congestion in a switch.

BACKGROUND

Mesh designs for interconnecting memory or processor cores are well known. But meshes often do not provide desirable latency with fewest hops and delay as possible. One application of a memory design is as shared packet memory for a high-performance, high-radix network switch fabric (requiring the memory itself to be likewise high-bandwidth and many-ported). Low latency is an important criterion for any network switch. In an Ethernet switch, in particular, the Ethernet protocol (IEEE 802.3-2018) requires all bytes of a packet to be transmitted in a contiguous burst without gaps. If the packet is allowed to begin transmitting before every byte of the packet has been read from the packet memory (also known as "cut-through" mode), there is a risk of underrun (no data available) if some subsequent part of the packet has excessive read latency. For a viable Ethernet switch product, this risk must be made negligible, which means controlling the tail latency of the memory.

Ethernet switches require many megabytes of packet memory due to the unscheduled nature of arrivals. Ethernet switches generally use the following memory organization: input buffer, output buffer, and/or a completely shared buffer. For examples of buffering and queueing, see: Michael G. Hluchyj and Mark J. Karol, Queueing in High-Performance Packet Switching. IEEE Journal on Selected Areas in Communications, Vol. 6, No. 9, December 1988. Input and output buffers are much easier to implement because they are subdivided into small buffers, each needing enough throughput for only a small group of ports (e.g. 1-2 Tbps).

However, shared memory can be more desirable, due to incast applications. In a typical transmission control protocol (TCP) incast applications, hundreds of input flows may simultaneously deliver bursts of 256 KB each to the switch. See, for example, Yanpei Chen, Rean Griffith, Junda Liu, Randy H. Katz, and Anthony D. Joseph, Understanding TCP Incast Throughput Collapse in Datacenter Networks. 2009 Proceedings of the 1st ACM Workshop on Research on Enterprise Networking (WREN 2009). In a high-performance switch (e.g., 10 Tbps+), input and output buffers must be highly subdivided, and cannot each be made large enough to hold a maximum size burst of traffic. Input buffering is better than output buffering in this case, but it still suffers cases where many flows arrive on a single input, or an input receives packets addressed to many congested outputs.

A 10 Tbps+ switch can transmit more than 10 packets every cycle, so packets are typically stored in separate memory banks. Because of the many factors affecting egress scheduling, there is the potential for a burst of reads to a single bank to exceed that bank's throughput for many cycles.

Unfortunately, high-throughput shared memory tends to have occasional high latency, which can cause underruns in a cut-through Ethernet switch. Tail latency refers to the worst-case latencies seen at very low probability—for example, the highest read latency observed out of $10^{15}$ read operations. Tail latency can also be measured from a cumulative probability distribution and it can have the lowest latency X such that latency >X occurs with probability no more than $10^{-15}$. It is desirable to keep tail latency as low as possible.

DETAILED DESCRIPTION

Figure 1A:
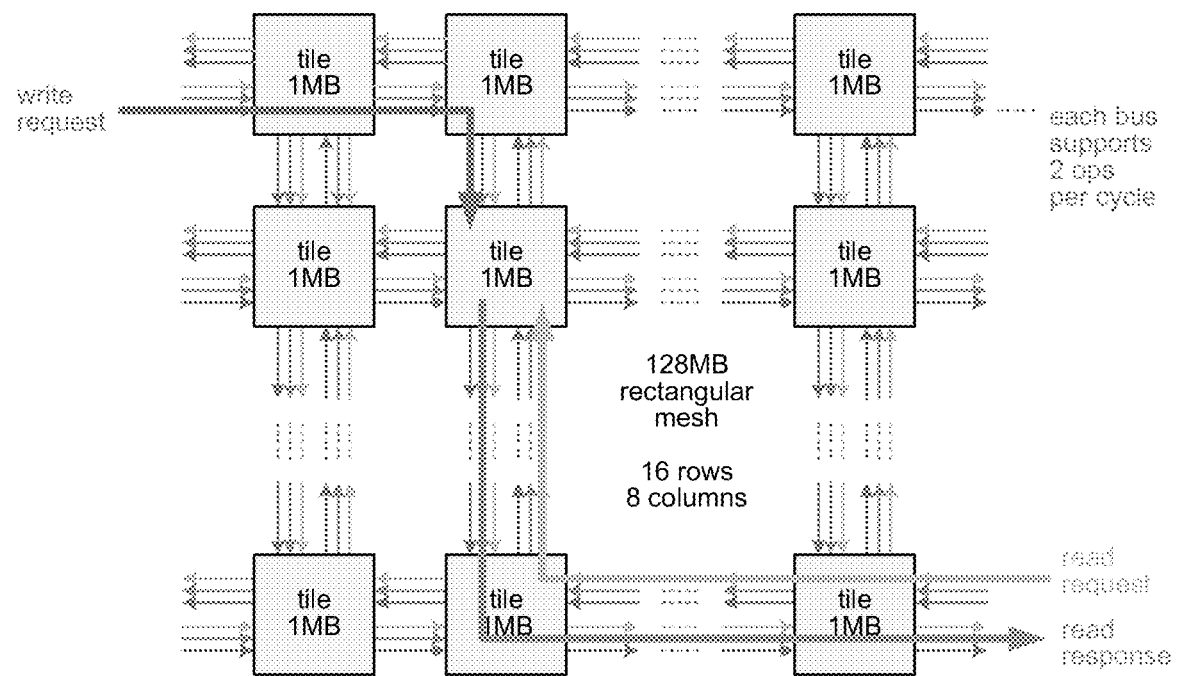
FIG. 1A shows an example of a routing scheme for a mesh that can be used for packets or other data.

A memory mesh allows dense packing of memory banks, reducing memory contention, but introduces shared bus resources that occasionally cause even higher latency. For example, 10 operations may be waiting to gain access to a bus, but it may take 100 cycles for these operations to all pass through the bus due to contention for the bus. If the egress port begins cut-through transmission within 100 cycles of the first word passing through the mesh (as generally desired) then underrun can occur.

Previous network on chip (NoC) work optimizes throughput, minimum latency, and average latency, but does not directly address occasional high latency. This is a problem for Ethernet cut-through operation, which must read data from the mesh in time for transmission. Accordingly, a challenge is to achieve acceptable average latency and tail latency.

Various embodiments permit use of a large, high-bandwidth, many-ported on-die memory mesh as a switch while potentially achieving both low average read latency and low tail latency. The mesh can be used for an Ethernet switch that supports receipt and transmission (ingress and egress) of Ethernet compliant packets. Ethernet is described for example in IEEE 802.3-2018. A mesh can include an array of tiles. A tile can include multiple nodes, where a node can include a bus to transfer operations arriving or departing in a particular direction. A tile can also include a memory block.

Various embodiments generate and use a latency estimate for operations at egress from a node, where latency estimate can be an estimate of time from packet segment fetch to packet transmission from an egress port. At points of queueing and arbitration within a tile in the mesh, such as changes of direction or termination of an operation by storage at a tile, operations are sorted to favor passthrough of the operation with the highest latency estimate. As the operation progresses through the mesh, the latency estimate may increase as the operation encounters congestion.

Various embodiments can potentially exponentially reduce the probability of encountering high latency (as a function of the latency target). For example, in Ethernet applications, for a 50 Tbps mesh, the effective latency required to achieve underrun probability below $10^{-15}$ can be reduced from 249 cycles to 76 cycles. Finally, at least because various embodiments can use simple XY direction routing, lower average latency can be achieved than prior work that is focused on throughput and average latency.

Various embodiments can include a mesh that provides traffic management in a datacenter, server, rack, blade, inter-component communication within a datacenter, and so forth. For example, north-south traffic or south-north traffic can include traffic that is received an external device (e.g., client, server, and so forth) but can include internal data center traffic (e.g., within a rack, server, between virtual machines, between containers). For example, east-west traffic or west-east traffic can include internal data center traffic (e.g., within a rack, server, between virtual machines, between containers), but can include traffic that is received an external device (e.g., client, server, and so forth).

Various embodiments can be used in any wired or wireless network (e,g., 3GPP LTE, 3GPP 5G, IEEE 802.11, satellite mesh network (e.g., Iridium, Starlink).

FIG. 1A shows an example of a routing scheme for a mesh that can be used for packets or other data. For example, packets can be Ethernet compliant, or other standards such as InfiniBand, Omni-Path, Token Ring, Fiber Distributed Data Interface (FDDI), Myrinet, and so forth. For example, a mesh can be a 50 Tbps rectangular mesh with routing in X or Y directions. Consider the specific example of the following 50 Tbps rectangular mesh consisting of 128 tiles with each tile containing 1 MB of memory (or other size). This mesh uses XY request routing and YX response routing whereby a request can travel horizontally until reaching its target column, then turns the corner to continue to a memory tile. For example, a response can travel vertically until it reaches its target row, then turns the corner to continue to an edge interface. Any other traversal pattern can be applied. At 100% utilization, this mesh would accept a total of 32 reads and 32 writes from the left edge, and as many from the right edge. Assuming random data allocation, minimum needed vertical wiring can be achieved. On average, 32 read requests would need to pass between the upper and lower halves of the mesh each cycle, using all of the vertical wiring that connects the upper and lower halves. Note that for the purposes of demonstrating utilization, these are on the left and right edges.

Shared resources in a mesh introduce occasional high latency which are an issue in Ethernet applications, as explained above. At 90% or higher mesh utilization, with a 100 cycle transmission delay after the first word has been fetched from the mesh, some mesh examples will underrun more than once per $10^6$ words, which is not acceptable in a switch application. This happens regardless of whether a fixed priority or round-robin arbitration rule is used for resolving contention across nodes. However, Ethernet products require a bit-error rate of at most $10^{44}$. For a word size of 512 bits, this provides a budget of 2 underruns per $10^{12}$ words.

At least to reduce tail latency and average latency, various embodiments attempt to prevent an operation from waiting too long an amount of time to turn a corner in a mesh (e.g., north-to-east, north-to-west, south-to-east, or south-to-west) or terminate at a destination device. In some examples, at all points of queueing and arbitration within the mesh, operations are sorted to favor the operation with the highest latency estimate. Various embodiments associate a latency estimate to each operation. The latency estimate may be the minimum possible time that the operation must remain in the mesh. For example, various embodiments associate the following latency estimate to each operation is the minimum possible time that the operation must remain in the mesh.

For example, various embodiments associate the following latency estimate to at least some operations:

latency estimate=(time spent in mesh)+(minimum time to traverse remaining distance), where minimum time to traverse remaining distance= (number of hops remaining from current tile to the memory tile, plus hops from the memory tile back to the requesting agent on the edge)* (cycles required per hop).

The minimum time to traverse remaining distance can be the sum of all minimum hop delays along the path the operation will take. For example, if all hops take N cycles in the absence of congestion, then the minimum time to traverse remaining distance is the number of hops multiplied by N.

As an operation progresses through the mesh, the latency estimate may increase as the operation encounters congestion (and therefore spends more time waiting without progressing). However, using the latency estimate formula introduced above, the latency estimate does not increase when an operation travels in a straight line, which can be used to optimize average latency.

Randomized access can be used in banked, scalable packet memory. Because a large switch has a large number of queues, and the scheduling of these queues is complex (due to supporting many different applications), there are many different possible correlations between the allocation and readout times of packet data. Addresses can be randomized to minimize the probability of a large number of simultaneous reads to the same bank. Address randomization can be achieved by scrambling (i.e., randomly permuting) the pool of free addresses. This is done both initially and when addresses are recycled. To make this effective, a minimum average of at least 1 address per mesh tile must be maintained in a free pool. For unicast operations, each address can be determined pseudo-randomly, and is written and read exactly once, and therefore the accesses are pseudo-random.

If memory allocation needs to be on a coarser granularity than the memory width, addresses within an allocation block can be striped across different columns of the mesh, so that reading all words of an allocation block does not cause contention on individual tiles or column buses. Further, the column allocation can be rotated for different allocation blocks, so that column usage is balanced when the allocation blocks are partially filled.

Figure 1B:
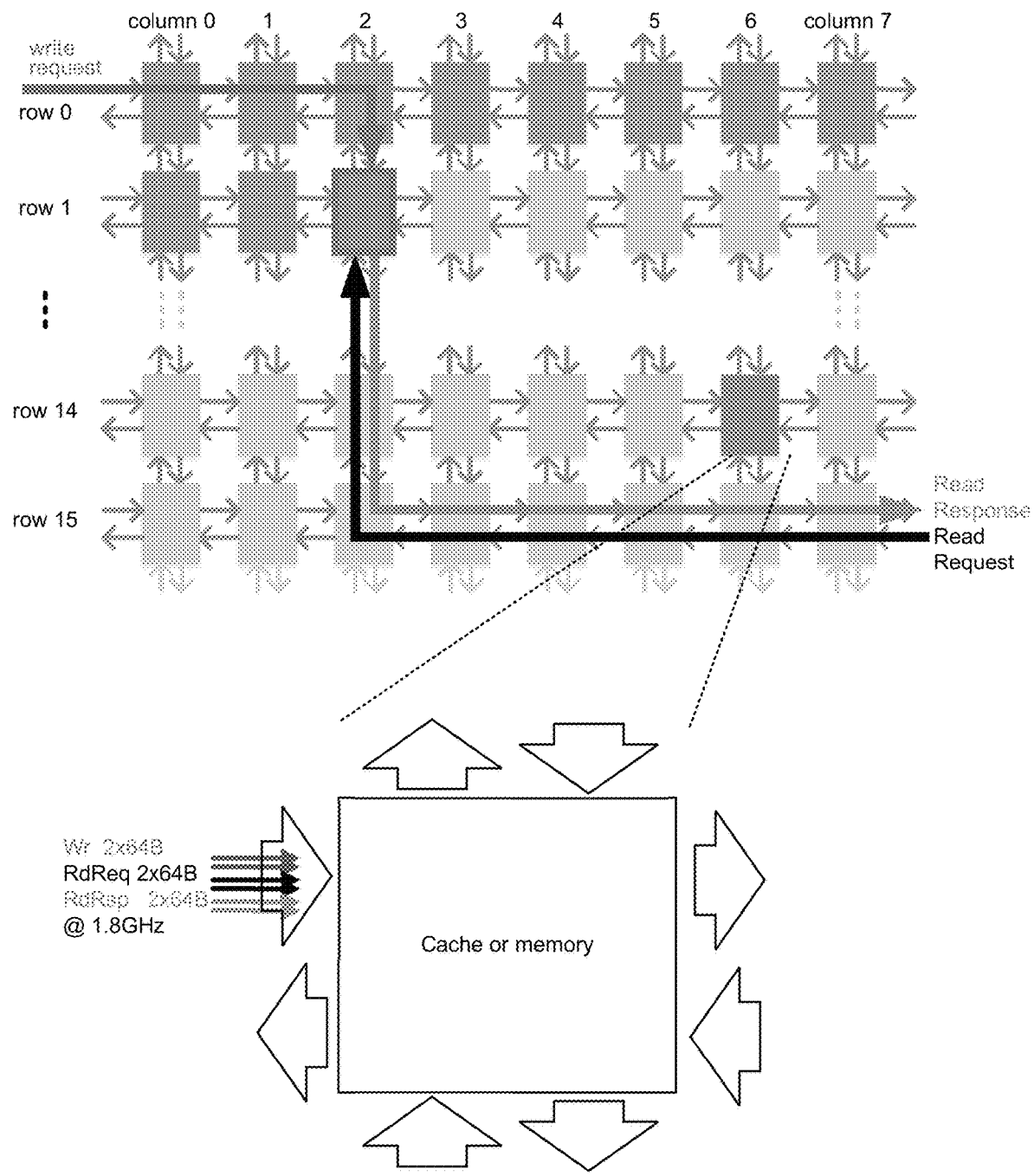
FIG. 1B depicts an example of a write request traversing a mesh to a tile.

FIG. 1B depicts an example of a write request traversing a mesh to a tile. FIG. 1B also shows an example of a read request made to the tile as well as read response. The tile can include a cache or memory device (e.g., 1 megabyte or other size).

Figure 1C:
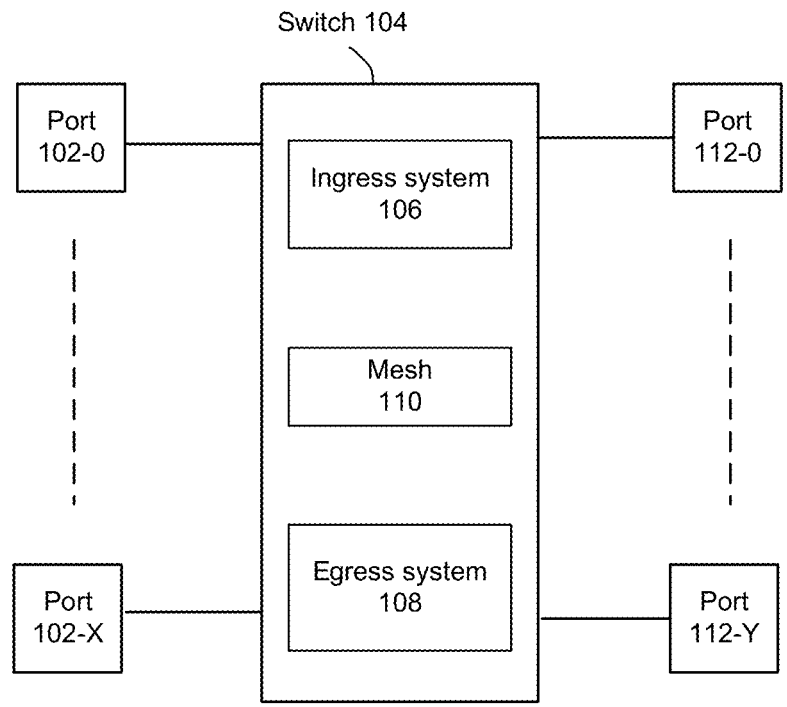
FIG. 1C depicts an example switch.

FIG. 1C depicts an example switch. Various embodiments can be used in or with the switch of FIG. 1C to manage flow of operations among nodes of a mesh. Switch can route packets or frames of any format or in accordance with any specification from any port 102-0 to 102-X to any of ports 112-0 to 112-Y (or vice versa). Any of ports 102-0 to 102-X can be connected to a network of one or more interconnected devices. Similarly, any of ports 112-0 to 112-X can be connected to a network of one or more interconnected devices.

Switch 104 can use ingress system 106 to process received packets from a network. Ingress system 106 can decide which port to transfer received packets or frames to using a table that maps packet characteristics with an associated output port or other calculation. Switch 104 can use egress system 108 to fetch packets from mesh 110, process packets, schedule egress of packets to a network using one or more ports, or drop packets. In addition, egress system 108 can perform packet replication for forwarding of a packet or frame to multiple ports and queuing of packets or frames prior to transfer to an output port.

Figure 2:
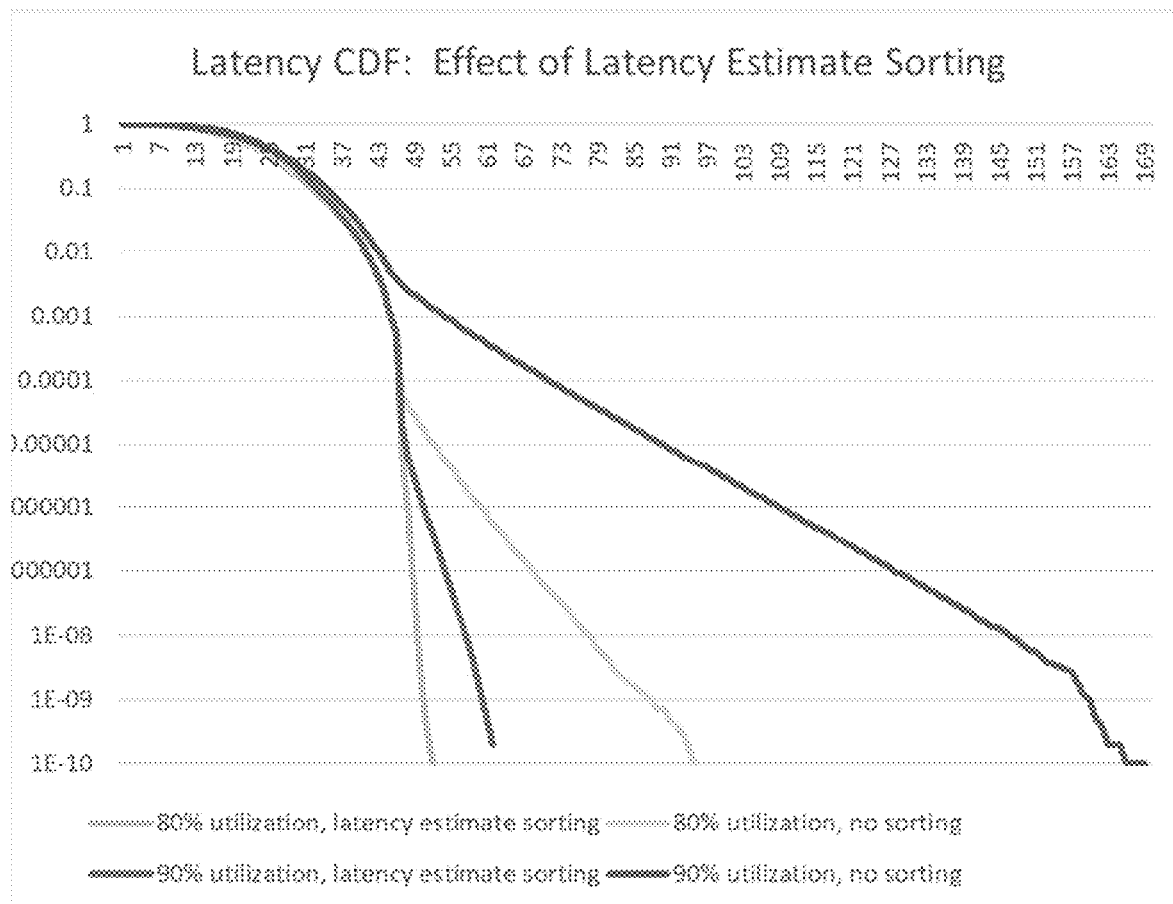
FIG. 2 shows a latency cumulative distribution function (CDF) example.

FIG. 2 shows a latency cumulative distribution function (CDF) for a 50 Tbps working mesh example. The horizontal axis (X) is in cycles, and the vertical axis (log scale) is the probability of a read operation having roundtrip latency greater than or equal to X. The graph illustrates that sorting and favoring by higher latency estimate can substantially lower the probability of reaching a given latency above 48 cycles. In some cases, below 48 cycles, the latency is dominated by travel time through the mesh, and therefore cannot be improved without improving the physical design of the mesh.

When underrun probability is to be reduced below $10^{-15}$, as in the case of Ethernet applications, sorting and favoring by latency priority can reduce latency by more than a factor of 2, as summarized in the following table:

| Utilization | Underrun probability | latency (no sorting) | latency (with sorting) | latency reduction by sorting |
|---|---|---|---|---|
| 80% | $10^{-5}$ | 52 | 47 | 9% |
| 80% | $10^{-10}$ | 95 | 52 | 45% |
| 80% | $10^{-15}$ (est) | 138 | 57 | 59% |
| 90% | $10^{-5}$ | 89 | 48 | 46% |
| 90% | $10^{-10}$ | 169 | 62 | 63% |
| 90% | $10^{-15}$ (est) | 249 | 76 | 69% |

Figure 3A:
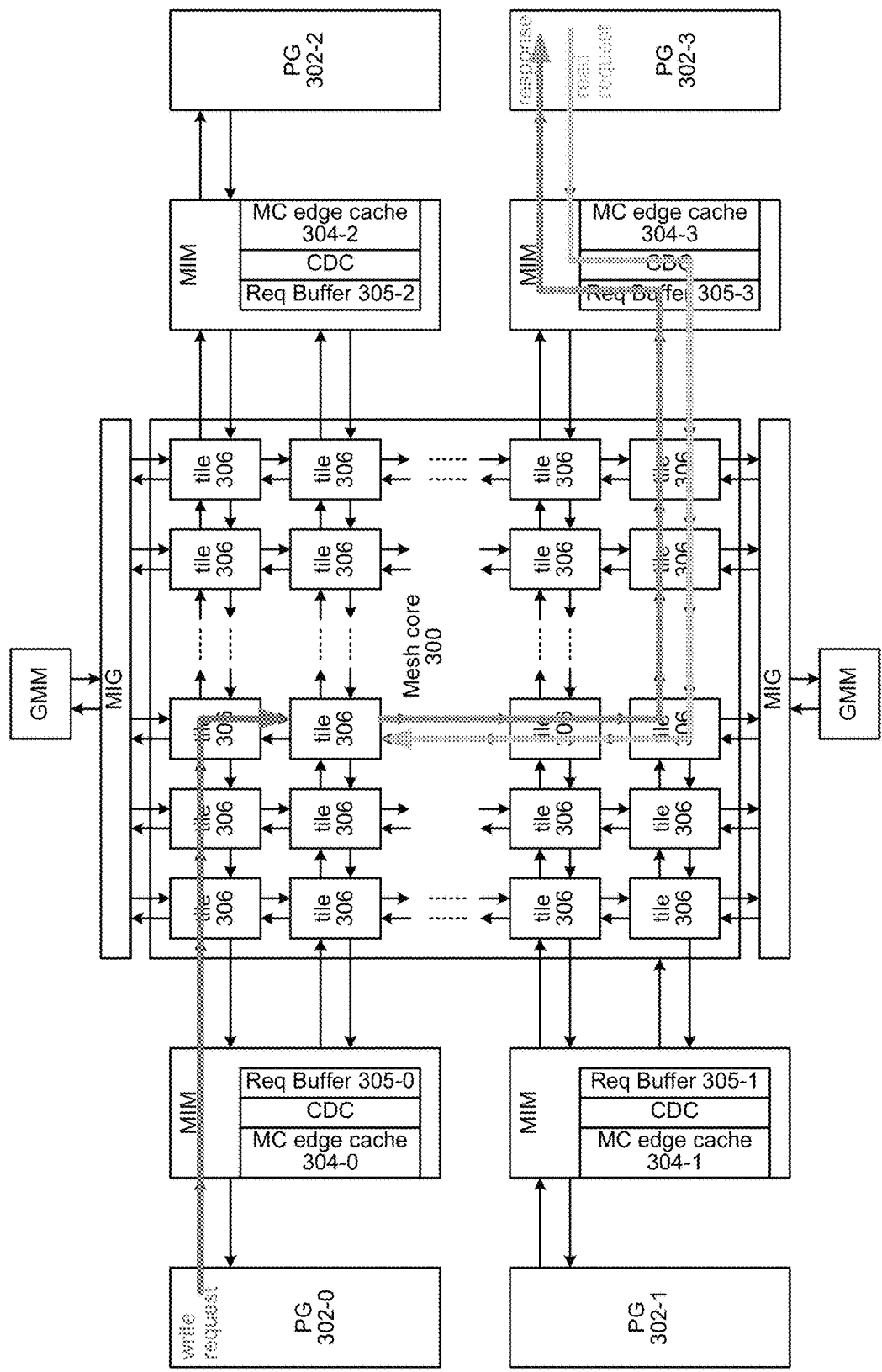
FIG. 3A depicts an example implementation of aspects of a mesh.

FIG. 3A depicts an example implementation of aspects of a mesh. Port groups 302-0 to 302-3 provide an input and/or output port to a network. In some examples, a port group (PG) has 16 switch ports and connects to 2 mesh ports, but other configurations can be used. A PG 302 provides packets in any format including Ethernet, InfiniBand, Omni-Path, Token Ring, FDDI, or Myrinet, and others. A PG 302 includes a scheduler and one or more queues (not shown). The scheduler (e.g., multiplexer) in a PG 302 determines which packets to egress from a queue. A packet is queued and processed to extract a priority value from the packet, to determine the next hop, and to calculate a queue ID. The queue ID is typically a function of the priority value and the next hop. A queue can have a maximum depth.

Multicast (MC) edge caches 304-0 to 304-3 can be implemented at the mesh boundary for a group of readers to attempt to limit the worst-case concurrent reads to the same address. For example, if there are 32 mesh ports and an MC edge cache 304 covers 1 port group and uses 2 mesh ports, then the MC edge cache 304 allows a maximum of 16 reads from any address to concurrently enter the mesh core. For example, if 10 copies of packet are sent per port group, a packet is read once per port group, and replication happens using the MC (edge) cache 304, which provides copies as read responses. Use of an MC cache 304 allows for a read group to not be grouped together and to be separately issued. An MC cache 304 discovers that multiple requests are made to the MC cache 304 and one read is executed. For example, request buffers 305-0 to 305-3 can be used to store outstanding requests for packet(s) in respective MC caches 304-0 to 304-3. For example, an MC cache 304 can search for outstanding read requests in a request (req) buffer 305 for the same packet sent to the mesh with no response provided yet. For example, a content addressable memory (CAM) can be used indicate outstanding requests and compares new requests against the list of outstanding requests. For example, an MC cache 304 can accumulate all requests for the same data into a single list and generate all responses in the list upon receiving the response to the single request that was sent to the mesh, by replicating the response data.

MC cache 304 can limit re-requests for the same piece of data or packet. MC cache 304 can be sized for typical multicast read bandwidth and latency. MC cache 304 can also, or alternatively, enqueue requests when a multicast (or table) read is launched and provide for a request to be forwarded to the mesh if there is not already a request to the same address.

One or more tiles of the mesh can include an MC tile cache 306. Note that MC tile cache 306 can refer to multiple separate independently operating tile caches or a single shared cache. MC tile cache 306 provides caching within each tile. MC tile cache 306 can store entries such as 4 entries or another number of entries. MC tile cache 306 services multi-cast reads to an address at a faster rate than that of static random access memory (SRAM). An operation that arrives into the MC tile cache 306 can be stored and MC tile cache 306 can provide multiple copies of same operation as output. A packet can include multiple operations and an operation can be a response. MC tile cache 306 allows a packet to be only written once so that there is one copy of a packet in a mesh 300 at a time to use less memory and less throughput and not the throttle ingress port because of writes.

Note that in FIG. 3A, CDC can refer to clock domain crossing. GMM can refer to global and memory management. MIG can refer to a mesh interface to GMM.

Figure 3B:
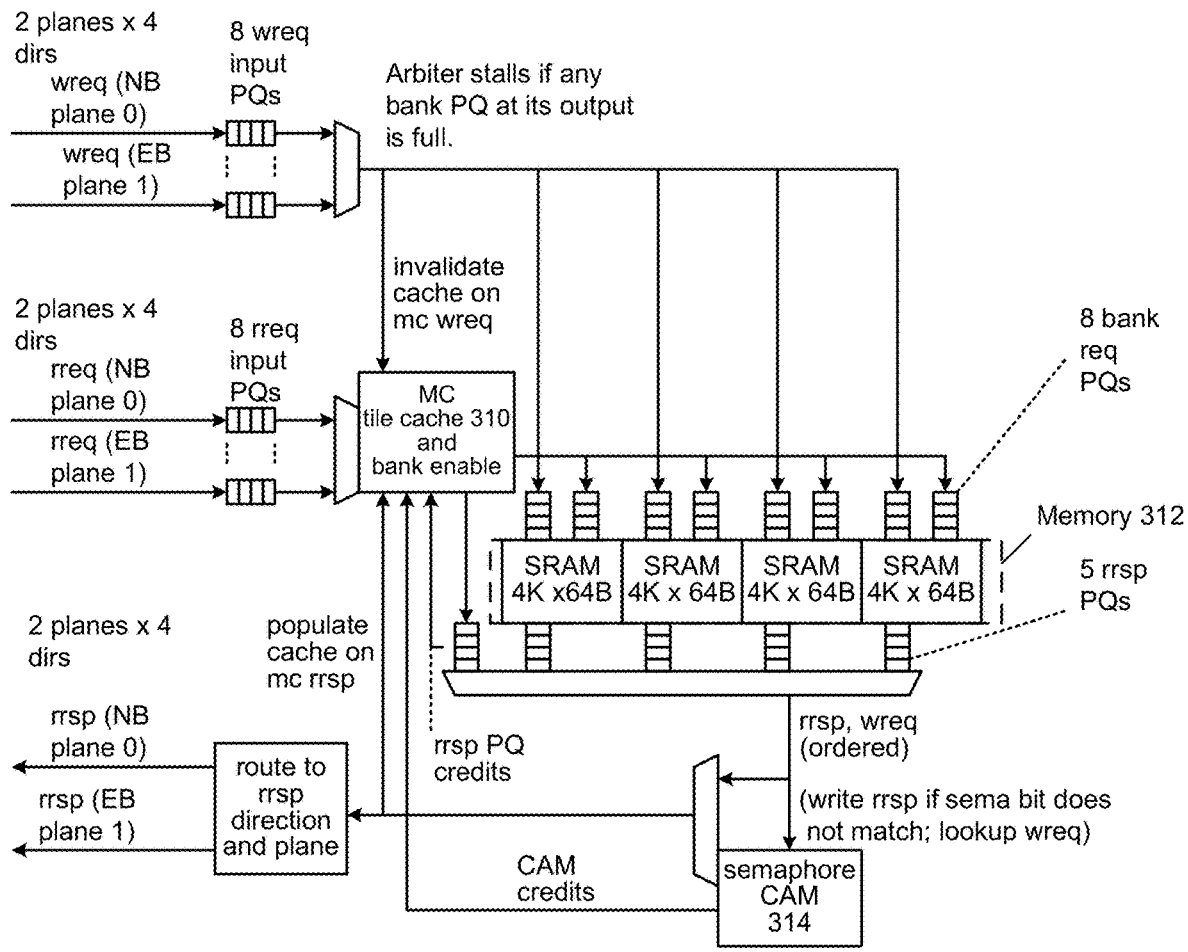
FIG. 3B depicts an example of a memory block including a multicast tile cache and the tile's memory.

FIG. 3B depicts an example of a memory block including an MC tile cache and the tile's memory. For example, a memory block can include a multicast (MC) tile cache 310 and four static random-access memory (SRAM) banks 312 and support two routing planes and the read after write (R-A-W) CAM discussed below. For multicast performance improvement, the mesh may include a multicast tile cache 310 with a memory block. Multicast tile cache 310 can be particularly helpful at least if individual banks in SRAM 312 are slower than the mesh routing fabric. An operation stored in the MC tile cache 310 allows the MC tile cache 310 to provide multiple copies of the same response from SRAM 312, so that the SRAM 312 is read only once.

Multicast tile cache 310 can be relatively small. For example, multicast tile cache 310 can be, e.g., 1-4 entries per tile. In situations where there are not very many different multicasts hitting the same tile at the same time, due to the large number of mesh tiles. There can be many requests originating from the same multicast packet, but that is supported with a relatively small sized cache.

Invalidating a cache entry in MC tile cache 310 can occur when the read value is returned would be sufficient to prevent concurrent reads into the mesh. Invalidating a cache entry in MC tile cache 310 can occur on write. This is possible, in part, because MC tile cache 310 sees all the writes, because MC tile cache 310 is present at the tile being written. This is in contrast to the edge cache (described later), which does not see all the writes because they come from a different port group. Additional invalidations may be used to avoid address cache recycling hazards, as explained below.

However, there is no guarantee in memory that two operations occur in an order launched. For example, if operation1 is requested before operation2, operation1 could start before operation2 but operation2 could complete before operation1 completes. If operation2 is a read and operation1 is a write, then it is desirable for operation1 to complete before operation2 starts to assure that a read operation reads the proper written information.

Semaphore CAM 314 provides for a semaphore bit (e.g., 1 bit per memory address or more bits) for a memory region. A word in the memory uses a toggle bit, which is also carried with each pointer in the system. When content is written into a memory location, the semaphore bit is toggled. A read operation is issued with a value to expect in the semaphore bit in order to perform a read. Read requests include the expected toggle bit value. If an expected semaphore bit does not match the semaphore bit stored, the read operation can wait until expected semaphore bit value occurs, subject to a ceiling on waiting time (or read timeout) before commencing with the read. In some examples, the memory can support polling for a write. A read operation can commence and the written semaphore bit is returned. If a written semaphore bit is not an expected value, one or more duplicate read requests can be issued until an expected semaphore bit value is read.

Note that for a unicast or multicast packet, one or more writes can be made and one write in a sequence of writes causes a toggle of the semaphore bit.

Latency of returning a write acknowledge can be avoided by using a semaphore mechanism to maintain read-after-write sequencing. Because a write is likely to complete before a subsequent read request reaches the memory bank, the semaphore stalls do not substantially affect the latency distribution.

This semaphore introduces a potential hazard if writes may be discarded without being read. The write is not acknowledged in any way, and it is theoretically possible that an unacknowledged write could be committed in error after a later write request. This problem may be avoided by performing dummy reads on discarded data.

Alternately, a minimum delay can be enforced by the memory allocation mechanism before reusing a discarded or freed address. A system in the mesh can detect and report any write request latency estimate that exceeds that minimum reuse delay (since the mesh is already sorting all write requests by latency estimate). When the latency estimate of any write request exceeds that minimum (which should be rare), an allocation manager extends the reuse delay until the condition is cleared, meaning that the high-latency write request has been committed to memory.

Figure 3C:
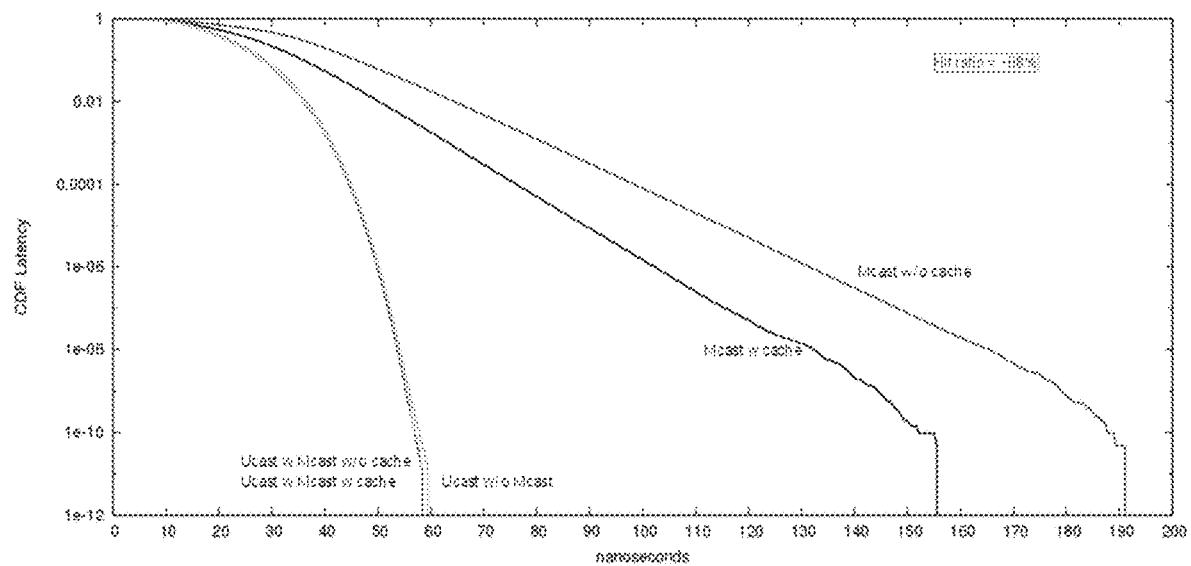
FIG. 3C shows an example in which a multicast tile cache delivers incremental tail latency improvement for a simulation.

FIG. 3C shows an example in which a multicast tile cache delivers incremental tail latency improvement for a simulation with a 16-entry MC tile cache.

Figure 3D:
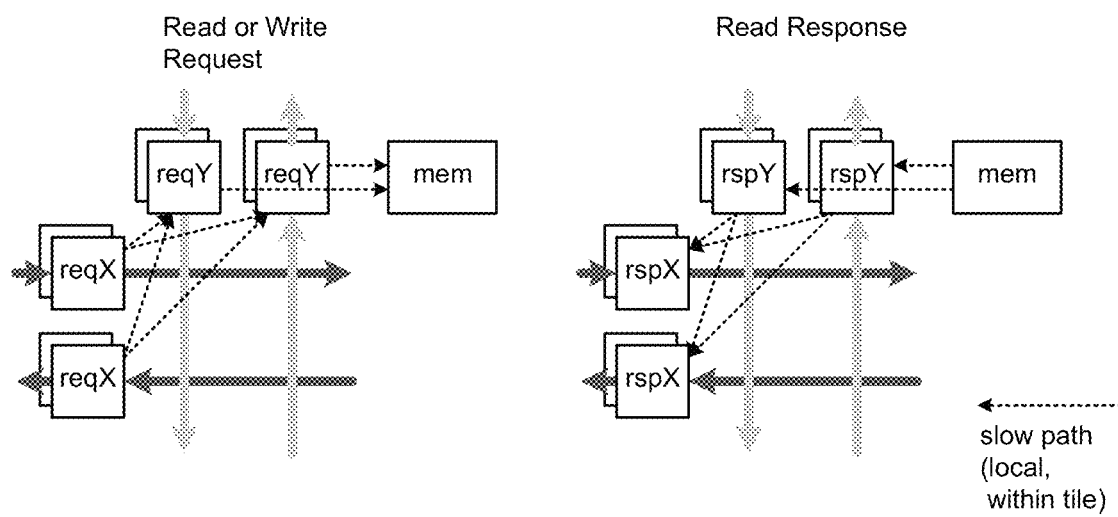
FIG. 3D shows an example structure for a mesh tile.

FIG. 3D shows an example structure for a mesh tile. A mesh tile can include nodes reqX, reqY, rspX, and rspY, and a memory block (shown as mem) (previously introduced in FIG. 3B). Fast paths, shown as solid lines, are connections to adjacent tiles, and are used when an operation continues in the same direction through the mesh. Slow paths, indicated by dotted lines, are used when an operation turns a corner or accesses local memory (e.g., mem). A request turning the corner passes from reqX to reqY whereas a response passes from rspY to rspX.

An advantage, but not a necessary feature, of some embodiments is that it can provide low average latency. For most of the cycles, operations travel in a straight line. In a mesh example, on average, an operation travels 4 hops horizontally, turns, and then travels 8 hops vertically. Therefore, latency can be reduced or not increased from having a fast path structure that continues moving the operation in its current direction.

Figure 4A:
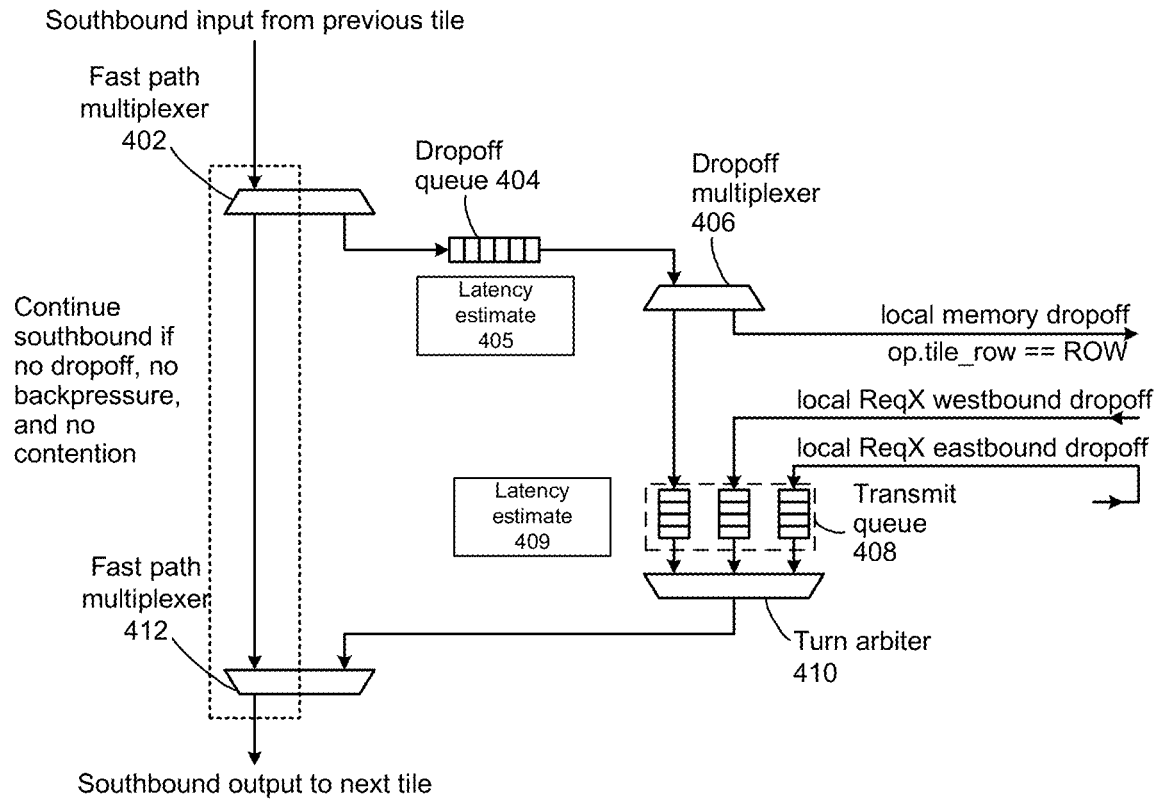
FIG. 4A shows an example of a southbound (SB) request bus.

FIG. 4A shows an example of a southbound (SB) request bus. For example, north-south traffic or south-north traffic can include traffic that is received an external device (e.g., client, server, and so forth) but can include internal data center traffic (e.g., within a rack, server, between virtual machines, between containers). The southbound request bus can receive request operations that are to continue in the north-to-south (fast path) direction to a tile or have turned off of a horizontal request bus (e.g., east-to-west or west-to-east) and are to proceed south. The fast path receives input traffic from a connected tile. There are at least 3 cases where an operation (e.g., read or write request) exits the fast path. First, the operation has reached its destination tile. Second, the operation encounters a turning operation or a queued operation. Third, backpressure is applied whereby the consuming interface does not have enough remaining queue storage to hold another operation.

For example, an operation continues on the fast path from a previous tile unless a packet is available in transmit queue 408 or there is backpressure from another tile (e.g., tile to the south). If transmit queue 408 is empty and there is no backpressure, and the operation is not being dropped off at the local memory, then the operation continues on the fast path southbound.

To help keep fast path latency down, arbitration can be avoided on the fast path by pulling an operation off the fast path when the operation turns or terminates at the tile or the operation encounters another operation that is turning (changing at 90 degrees or terminating at the tile). Most of the operation's cycles are not spent in contention. This means that both the contention and turns cases can be handled off the fast path, at additional latency cost, without contributing substantially to the overall latency. For a 16×8 mesh example, even at full throughput, this is expected to occur on only 2 of the 8 typical hops within a request column. On any given cycle, each column is processing 4 turns. But on average, only 2 of these overlap with an existing operation. In this example, under full load, 75% of the straight-line hops can use the fast path. At lower loads, even more hops use the fast path.

An operation can be a request or response. A request can be a read or write. A request can include an address and tile address, as well as the requester PG (to be able to return the response to the correct PG). A response to a write is not needed in the semaphore embodiments described herein. A response includes data, and does not need to include the address, as that has already been consumed. If responses do not include the address, then all operations need an operation ID to distinguish the operations. If an MC edge cache is not used, then, for the purposes of distinguishing responses, an operation ID can be used instead of an address because an operation ID is unique.

A request bus can use a drop off router that includes a fast path demultiplexer 402, drop off queue 404, and drop off demultiplexer 406. A transmit queue can include one or more queue of transmit queue 408. Fast path demultiplexer 402 may deliver an operation: (a) to a tile below (continuing in the same north-to-south direction on the fast path), (b) for drop off to local memory via drop off queue 404, or (c) to a drop off queue 404 due to congestion. For example, drop off queue 404 receives operations from fast path demultiplexer 402 that encounter contention that are to traverse the north-to-south direction.

In some examples, the drop off router includes a transmit queue. In some examples, the drop off router includes a separate queue from the transmit queue and the drop off router is to sort operations to permit output of an operation with a highest latency estimate. In some examples, the drop off router has a separate queue from the transmit queue and the transmit queue is to sort operations to permit output of an operation with a highest latency estimate. The drop off router can deliver operations to a low-latency fast path that skips latency sorting and aging, except in the following cases: the operation has reached a destination memory device, the operation encounters a turning operation, or backpressure is applied by a node connected to the second node.

Packets that exit the fast path are stored in dropoff queue 404. Packets in dropoff queue 404 receive a latency estimate (e.g., stored in latency estimate 405 in memory). Packets in dropoff queue 404 could feed transmit queue 408 or be provided for termination at a local memory. Note that for each cycle that an operation is waiting in a queue, its latency estimate must be incremented.

In some embodiments, drop off queue 404 can support multiple unicast and multicast operations. For example, drop off queue 404 can be allocated to store 4 unicast operations to 2 multicast operations, although other sizes and ratios can be used. Drop off queue 404 can provide operations to drop off demultiplexer 406. Demultiplexer 406 can provide operations to a local memory or transmit queue 408 for continued traversal in the north-to-south direction subject to scheduling.

Transmit queue 408 can include one or more queues. Transmit queue 408 holds operations waiting to enter (or re-enter) the fast path. If a request is received from a left or right tile (eastbound or westbound bus), or if a non-dropoff request is received from the tile above (north) and a queue in transmit queue 408 is already non-empty, then the received request is provided to a queue in transmit queue 408. If a request is received from a left or right tile (eastbound or westbound bus), or if a non-dropoff request is received from the tile above (north) and a queue in transmit queue 408 is already non-empty, then the received request is provided to a queue in transmit queue 408. If a request is addressed to the local memory, input traffic is provided to the local memory.

Transmit queue 408 can be used to support traffic from an east or west tile that is to proceed in the south direction. In some examples, one or more queues among transmit queue 408 are used for requests that are from a westbound operation and one or more queues among transmit queue 408 are used for requests that are from an eastbound operation. But a queue can support traffic from any direction.

Operations (e.g., requests) in transmit queue 408 can have an associated latency estimate determined and stored in latency estimate 409 in memory, determined in a manner described earlier. In addition, a latency estimate can be calculated for operations from an east or west tile and in transmit queue 408. For requests in transmit queue 408, a request with the highest latency estimate is placed at the front of transmit queue 408. An oldest request is selected based on timer and latency estimate to go out of turn arbiter 410 for providing to fast path multiplexer 412 and will receive priority over a south traveling packet on the fast path. If an operation from turn arbiter 410 enters the fast path and is prioritized over the packet on the fast path, the operation on the fast path is placed into dropoff queue 404.

A queue in transmit queue 408 can include slots allocated for unicast operations and slots allocated for multicast operations. In some examples, the slots allocated for unicast operations and slots allocated for multicast operations can be the same number or ratio, but other ratios can be used.

In some examples, a packet has a designation of whether it is multicast or unicast. Operation priority applied by turn arbiter 410 for entering the fast path can additionally or alternatively be assigned based on whether a packet is multicast or unicast. Multicast packets have a lower priority than unicast packets. As is described in more detail later, a credit mechanism for backpressure for filled queues are separate for unicast versus multicast with priority given to unicast.

A northbound (south-to-north) request bus can use a similar scheme but the fast path goes from south to north.

Figure 4B:
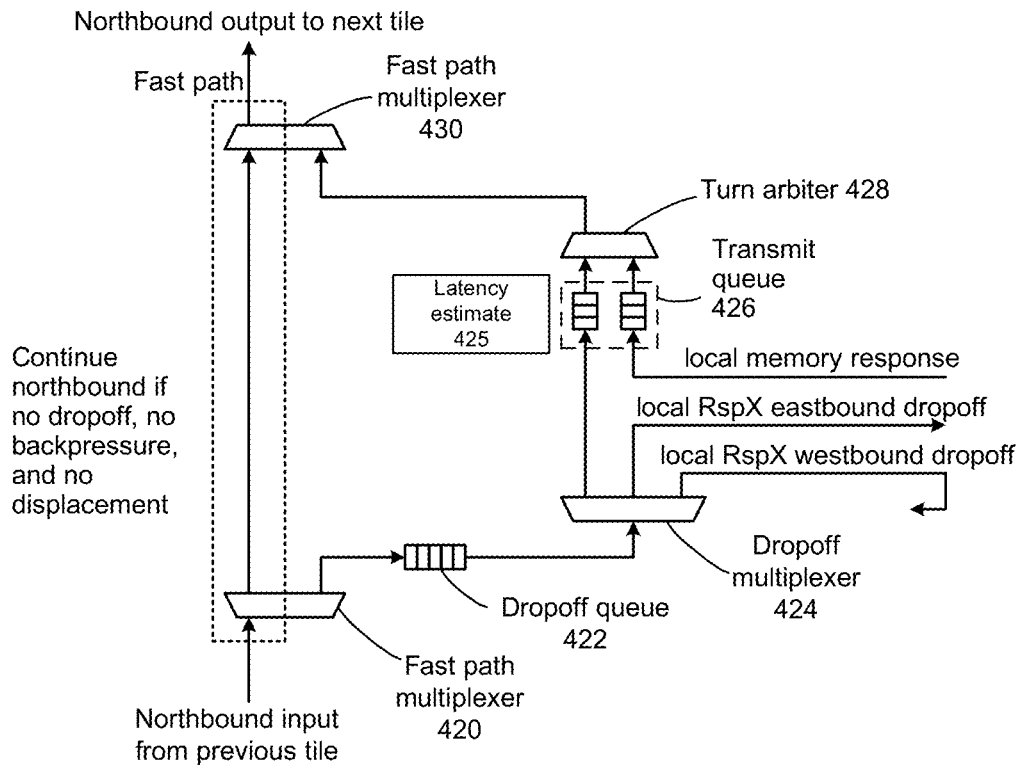
FIG. 4B shows an example of northbound (NB) response bus.

FIG. 4B shows an example of northbound (NB) response bus. Fast path multiplexer 420 can receive responses from another tile. The response can continue northbound if the response is not to be dropped off at the tile (e.g., to a memory), there is no backpressure from another tile, and no displacement (e.g., another response is to enter the fast path).

If the response is to exit the fast path, the response is provided to drop off queue 422. A latency estimate can be determined for the response placed in drop off queue 422. An example latency estimate determination is provided earlier. In some examples, drop off queue 422 can have slots allocated for unicast and multicast operations (e.g., responses). For example, drop off queue 422 can have four times a number of slots allocated for unicast than slots for multicast operations (e.g., responses), although other ratios can be used.

Dropoff multiplexer 424 can direct operations to a westbound direction tile, an eastbound direction tile, or to the fast path in the northbound direction. Transmit queue 426 can receive operations from drop off multiplexer 424 or local memory for transmission in the northbound direction.

In some examples, transmit queue 426 can have slots allocated for unicast and multicast operations (e.g., responses). For example, transmit queue 426 can have two times a number of slots allocated for unicast than slots for multicast operations (e.g., responses), although other ratios can be used.

Turn arbiter 428 can select an oldest response from transmit queue 426 based on timer and latency estimate to go to fast path multiplexer 430. For example, latency estimate 425 can determine and store latency estimates for some responses in transmit queue 426. Fast path multiplexer 430 can provide response for traversal on the fast path in the northbound direction and will receive priority over a north traveling packet on the fast path.

In some examples, a packet has designation of whether it is multicast or unicast. Operation priority applied by turn arbiter 428 for entering the fast path can additionally or alternatively be assigned based on whether a packet is multicast or unicast. Multicast packets have a lower priority than unicast packets. As is described in more detail later, a credit mechanism for backpressure for filled queues are separate for unicast versus multicast with priority given to unicast.

A southbound (north-to-south) request bus can use a similar scheme but the fast path goes from north to south.

Figure 5A:
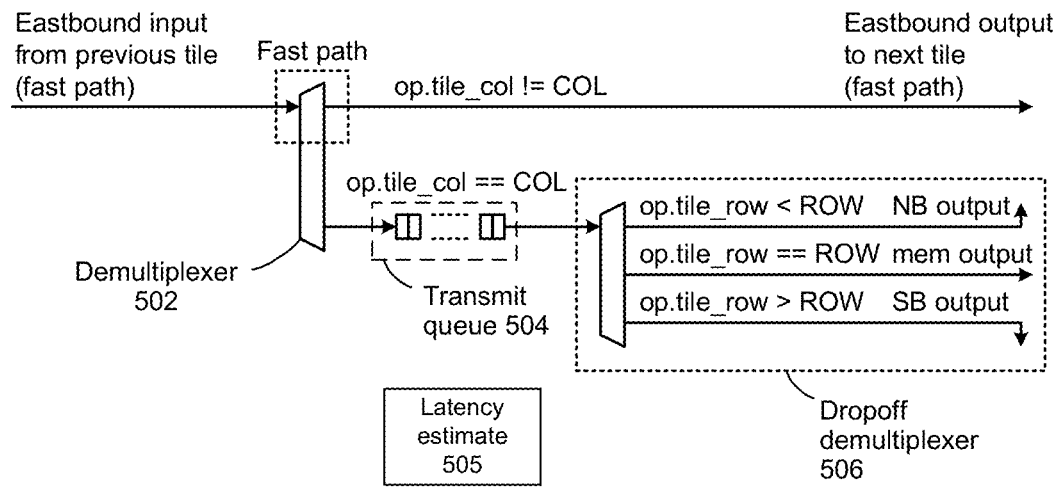
FIG. 5A depicts an example of an east-west request path.

FIG. 5A depicts an example of an east-west request path. For example, east-west traffic or west-east traffic can include internal data center traffic (e.g., within a rack, server, between virtual machines, between containers), but can include traffic that is received an external device (e.g., client, server, and so forth). A packet that is eastbound continues on a fast path. However, if a packet changes directions or terminates at a destination (e.g., memory), multiplexer 502 places the packet into transmit queue 504. Transmit queue 504 is a priority queue with sorted order whereby a packet (e.g., request) with highest latency estimate is always put to the front to reduce its latency. For example, latency estimate 505 can determine and store latency estimates for some responses in transmit queue 504. Transmit queue 504 provides packets to drop off demultiplexer 506 for routing to a destination memory device, northbound direction to another tile, or southbound direction to another tile.

Drop off demultiplexer 506 can prioritize forwarding of operations that are unicast over multicast operations. As is described in more detail later, a credit mechanism for backpressure for filled queues are separate for unicast versus multicast with priority given to unicast. In some examples, transmit queue 504 can include five times a number of slots for unicast operations as slots for multicast operations, although other ratios can be used.

In an example mesh, there are no turns onto ReqX. The sequence is ReqX to ReqY to RspY to RspX (with the exception that steps are skipped if memX=portX or memY=portY).

A west-to-east request path can use a similar scheme but the fast path goes from west to east.

Figure 5B:
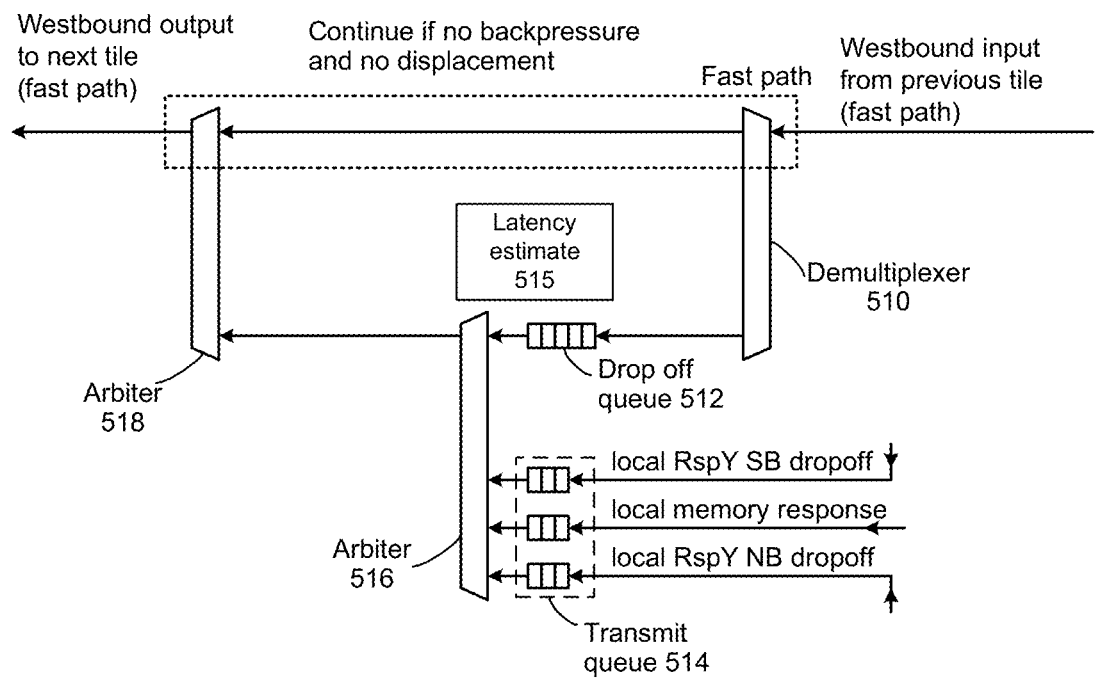
FIG. 5B depicts an example of an east-west response path.

FIG. 5B depicts an example of an east-west response path. A packet (operation) continues on the fast path unless another packet is available in drop off queue 512 or transmit queue 514 or there is backpressure. For example, backpressure can occur if there are no credit from a next tile that is to receive operations from the response path. For example, displacement can occur from operations entering the fast path from an output of arbiter 518. If there is no operation in drop off queue 512 or transmit queue 514 and there is no backpressure, then any packet from the fast path continues west bound.

Drop off queue 512 can receive operations (responses) that exit the fast path because of displacement or backpressure. For example, an operation on the fast path is placed into drop off queue 512 if a packet from arbiter 516 enters the fast path or backpressure occurs. Transmit queue 514 can receive northbound operations from another tile, southbound operations from another tile, or responses from a memory device.

Latency estimate 515 can determine and store a latency estimate for responses in drop off queue 512 and/or transmit queue 514. The response in drop off queue 512 or transmit queue 514 with a longest latency estimate is to enter the fast path using arbiter 516 and 518 regardless of whether from drop off queue 512 or transmit queue 514. For example, a response in drop off queue 512 or transmit queue 514 with the highest latency estimate is placed at the front of its queue (e.g., drop off queue 512 or transmit queue 514). Arbiter 516 sorts operations in drop off queue 512 or transmit queue 514 by latency estimate to at least partially address the tail latency problem. This sorting and arbitration may take several cycles but has a limited effect on overall latency due to this occurring on a small minority of the operation's hops. An oldest response is selected based on a latency estimate to output from arbiter 516 for providing to arbiter 518 and will receive priority over an east-west traveling operation on the fast path.

In some embodiments, drop off queue 512 can support multiple unicast and multicast operations. For example, drop off queue 512 can be allocated to store 4 unicast operations to 1 multicast operations, although other sizes and ratios can be used. Likewise, in some embodiments, in some embodiments, transmit queue 514 can support multiple unicast and multicast operations. For example, transmit queue 514 can be allocated to store 2 unicast operations to 1 multicast operations, although other sizes and ratios can be used.

In some examples, a drop off router can include demultiplexer 510 and drop off queue 512. In some examples, a transmit queue can include drop off queue 512 and one or more of transmit queues 514.

A west-to-east response path can use a similar scheme but the fast path goes from west to east.

Figure 6A:
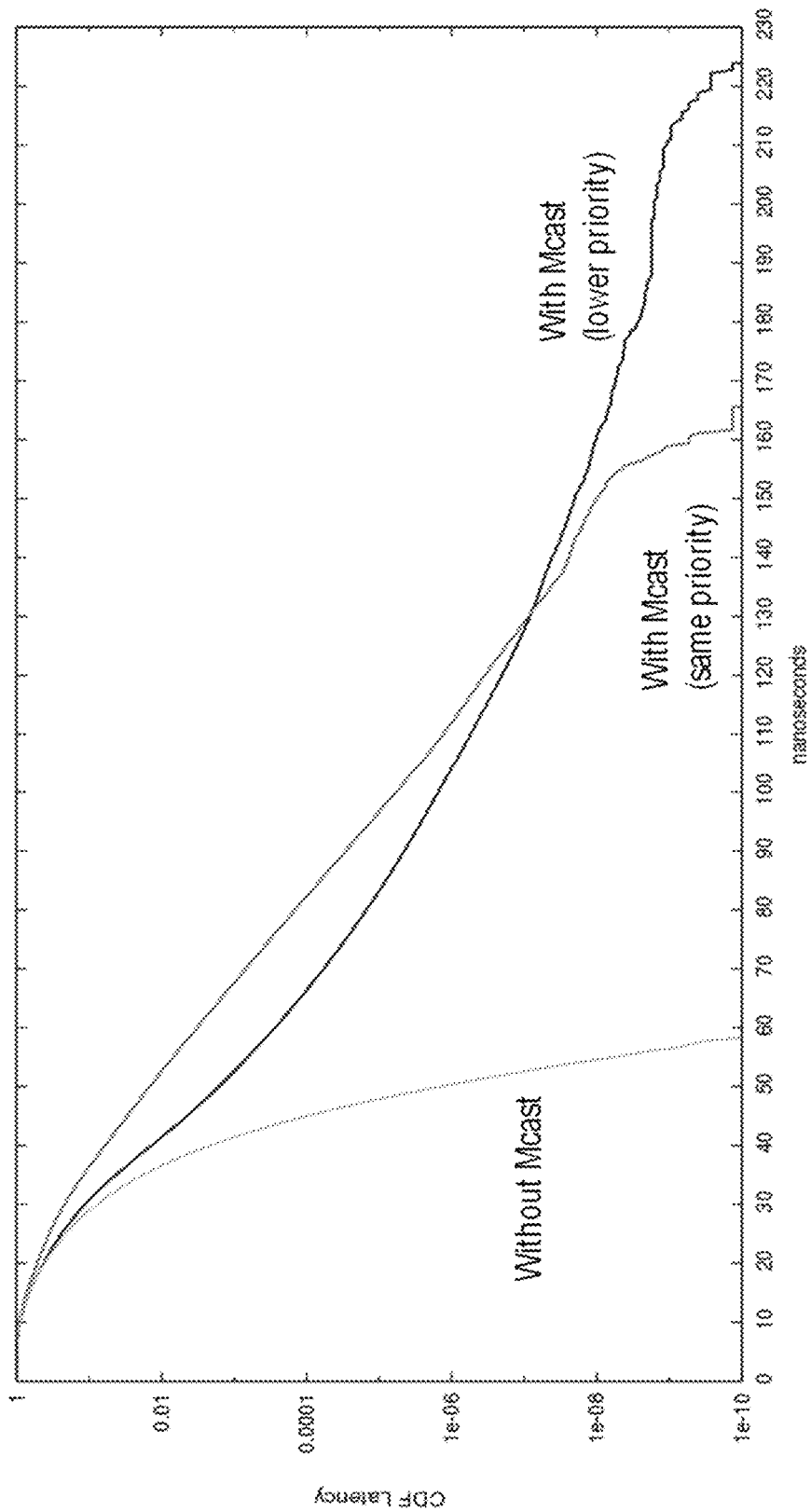
FIG. 6A depicts an example of effect on tail latency using multicast or table lookups.

FIG. 6A depicts an example of effect on tail latency using multicast or table lookups. Due to the large die area consumed by a deep shared memory, it is desirable to be able to use this memory for multicast and table lookups. These cases use a different approach (versus unicast) because reads to the same address are highly correlated. For an example, a comparison is made between the all-unicast case to a case where 30% of the egress traffic is multicast, where each packet is copied to 16 mesh ports.

More specifically, FIG. 6A shows cumulative distribution function (CDF) latency for three scenarios. First, without multicast (Mcast) where unicast latency without multicast. Second, with Mcast where unicast latency with multicast present (without any design enhancement for multicast). Third, with Mcast (lower priority) which involves lowering priority of the multicast requests (by subtracting an offset from the latency estimate, but not introducing a virtual plane). Accordingly, a virtual plane can be part of the solution to prevent unicast latency from being affected by multicast.

Some of a queue's slots (e.g., any of queues 404, 408, 422, 426, 504, 512, or 514) are dedicated to store unicast operations. Additional queue slots can either be dedicated to multicast or shared by unicast and multicast. The two resulting types of multicast and unicast queue slots use separate backpressure schemes.

For north-south, south-north, east-west and west-east request or response directions, backpressure is used to prevent operations (e.g., requests or responses) from being lost when a queue fills so that queues have space for traffic. For example, backpressure tells a connected node if a drop off queue or transmit queue is full. Drop off queue or transmit queue depth utilization can follow a statistical distribution with a long tail similar to the latency distribution. Therefore, the queues can fill with some small probability no matter their depth.

Figure 6B:
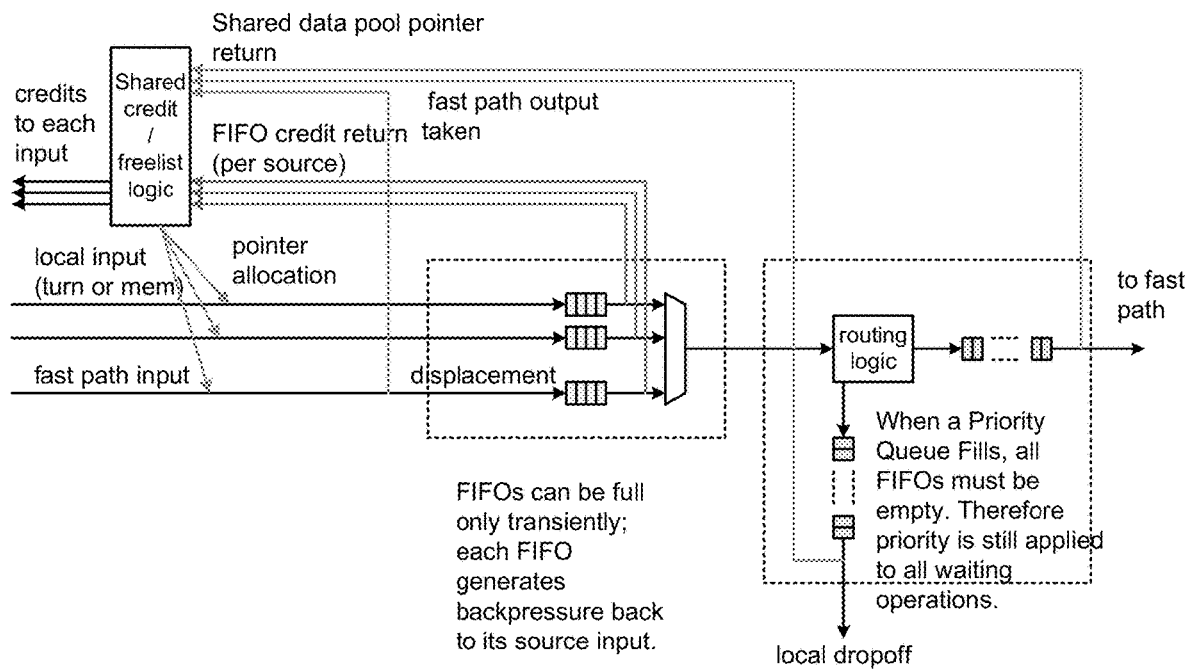
FIG. 6B depicts an example backpressure system.

FIG. 6B depicts an example backpressure system. A multicast virtual plane provides that multicast backpressure does not affect unicast operations. For unicast, a separate backpressure mechanism is used from a backpressure mechanism for multicast. When supporting the virtual plane, separate credits are provided for the multicast operations than for unicast operations. In some examples, signals that directly enable transmission when asserted (e.g., encoded via XON/XOFF) can be used for backpressure. XON/XOFF can be messages that control transmit rate. The dedicated plane may be implemented as a full routing plane (complete with separate wires and queues), or as a virtual plane (either time division multiplexing (TDM) or strict higher priority for unicast).

Implementing point-to-point backpressure between adjacent tiles or nodes is sufficient to minimally affect performance. It is also possible to use end-to-end credits (passing credit to source node), which is simple to implement in the horizontal request bus. End-to-end credits can be more efficient because they prevent contention at one tile from affecting drop off to other tiles. For end-to-end credits or multicycle handshake loops, credits can be more efficient because they allow some transmission (albeit at lower throughput) when buffers are partly full. If using a faster, single-cycle handshake, then there is no advantage to credits because normal transmission is allowed even when the buffer is nearly full.

Various embodiments provide a dedicated plane for multicast and table lookups. Table lookups can be used in packet processing. For example, a table lookup can be used for looking up the next hop entry in Internet Protocol (IP) routing. Because multicast and table lookups have correlated reads, they will have higher tail latency. Fortunately, tail latency is not as much of a concern in these cases, as there is typically no underrun hazard. Multicast packets are typically stored before transmission starts, therefore there is no underrun hazard. Table lookups typically occur during routing and packet transformation decisions that must occur before transmission starts, and therefore there is no underrun hazard.

The dedicated plane may be implemented as a full routing plane (complete with separate wires and queues), or as a virtual plane (either TDM or opportunistic) within the existing structure.

Given the performance requirements discussed above, the multicast plane needs only enough resources to progress, whereas the unicast plane needs additional queue slots to reduce tail latency. For multicast backpressure, multiple copies of a packet made by switch are sent through mesh at same or different times. Accordingly, a queue size for drop off or transmit queues are not made bigger than needed. In addition, priority queues cost area roughly proportional to their depth. There are diminishing returns to adding additional buffer slots, because the probability of using the extra slots is low. For example, to support 30% egress multicast in the 16×8 mesh, with minimized unicast tail latency, the drop off queues could be given 4 unicast slots, but only 2 multicast slots or a ratio of 2 unicast slots to 1 multicast slot.

Figure 6C:
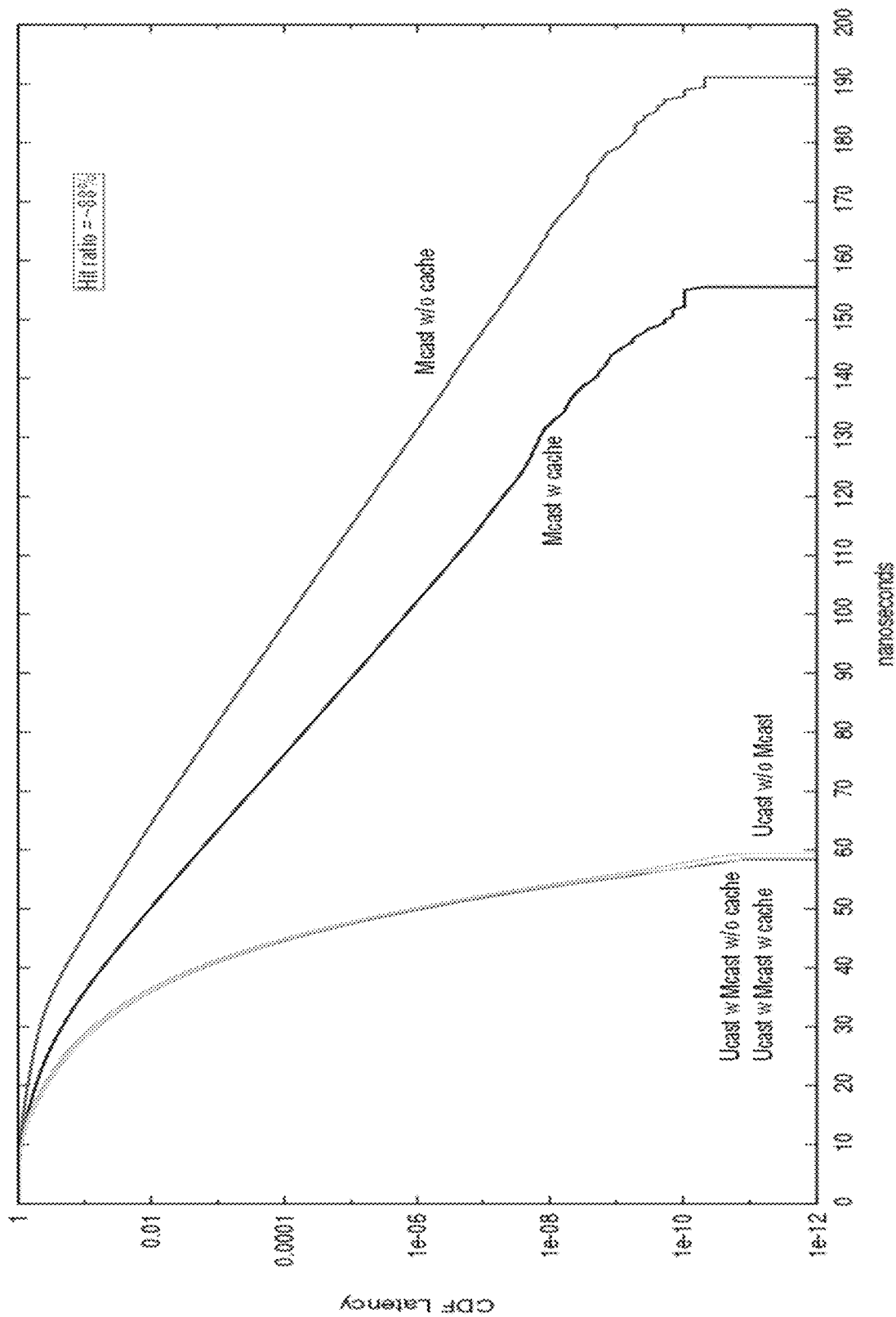
FIG. 6C illustrates incremental tail latency improvement from multicast tile cache.

FIG. 6C illustrates incremental tail latency improvement from multicast tile cache (simulated with a 16-entry tile cache). This graph assumes that a virtual plane is implemented, which is why multicast traffic has a negligible effect on unicast latency.

Figure 7:
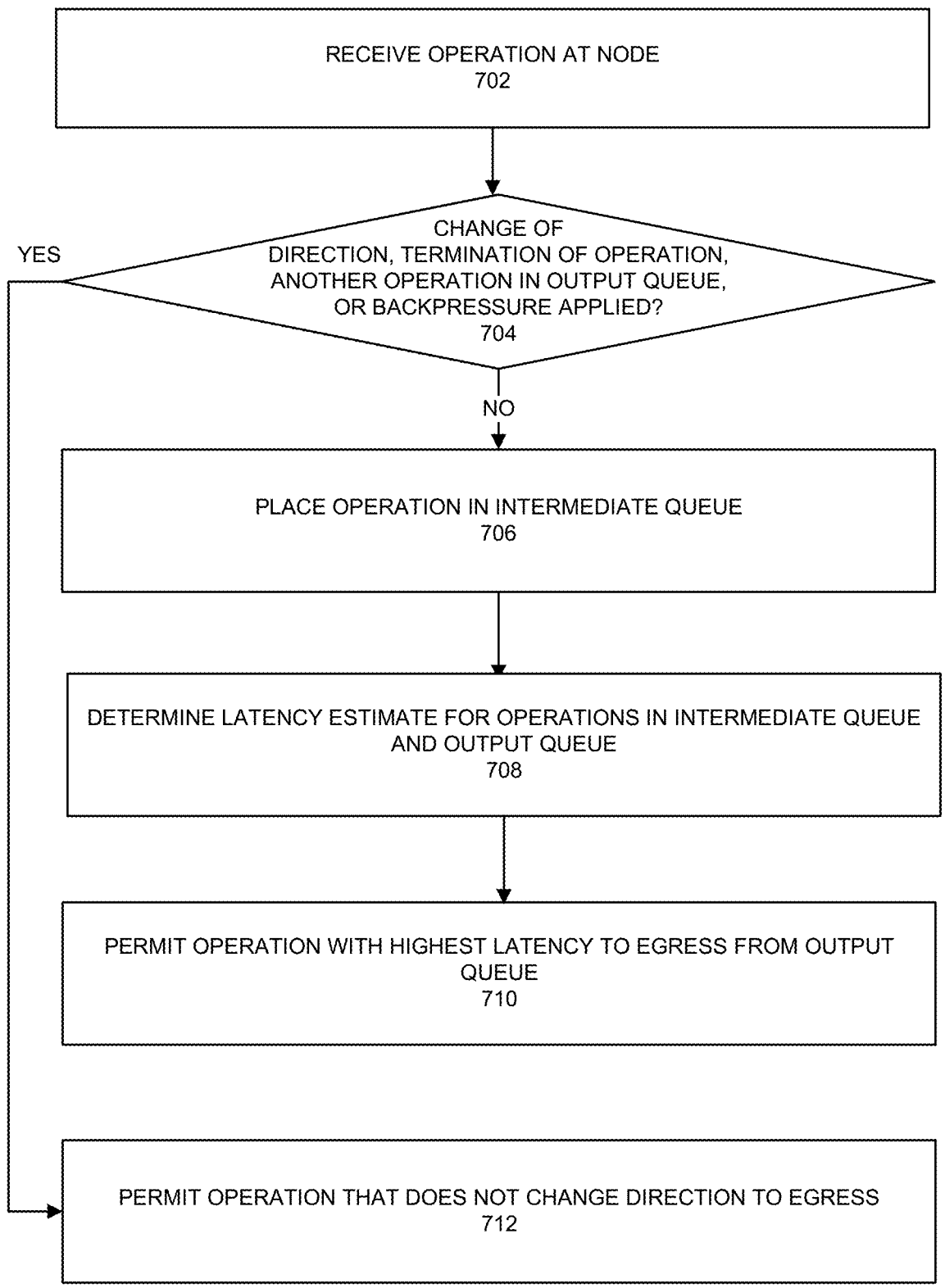
FIG. 7 depicts an example process that can be used at a node in a mesh.

FIG. 7 depicts an example process that can be used at a node in a mesh. At 702, the process receives an operation at a node. An operation can include a request command, response command, data, a packet, metadata, addresses, or other information. At 704, a determination is made as to whether there is a change in direction of the operation, termination of the operation at the node, another operation is available in an output queue, or whether backpressure is applied. For example, the operation is to continue in the same direction unless there is a change of direction of the operation, termination of the operation at the node, another operation is available in an output queue at the node, or backpressure is applied. If there is a change of direction of the operation, termination of the operation at the node, another operation is available in an output queue at the node, or backpressure is applied, then 706 follows. If the operation does not change direction, the operation does not terminate at the node, no operation is available in an output queue, and backpressure is not applied, then 712 follows.

At 706, the process places the received operation in an intermediate queue. Operations in the intermediate queue can also include operations to a memory block (e.g., memory drop off), or to another tile in a different direction. For example, operations to a memory block can include providing the operation to a memory connected to the node. For example, if a direction of the operation was southbound or northbound, a change of direction can be to westbound or eastbound. For example, if a direction of the operation was westbound or eastbound, a change of direction can be to southbound or northbound. Operations in an intermediate queue can be advanced to an output queue.

At 708, a latency estimate is determined for operations in the intermediate queue and/or output queue. The intermediate queue can be a drop off queue. The output queue can be a drop off queue and/or transmit queue. A latency estimate can be determined in accordance with examples described herein. For example, latency estimate=(time spent in mesh)+(minimum time to traverse remaining distance), where minimum time to traverse remaining distance=(number of hops remaining from current tile to the memory tile, plus hops from the memory tile back to the requesting agent on the edge)*(cycles required per hop).

At 710, the process permits the operation with the highest latency estimate in the output queue to egress from the node. The operation with the highest latency estimate can be an operation that has spent an estimated most time traversing a mesh of a switch fabric. In some examples, the operation with highest latency estimate in the output queue is allowed to egress from the node if no backpressure is applied.

At 712, the process permits the operation that does not change direction or terminate at the node to egress to a next node. The next node can be in north, south, east, or west direction relative to the node.

Figure 8:
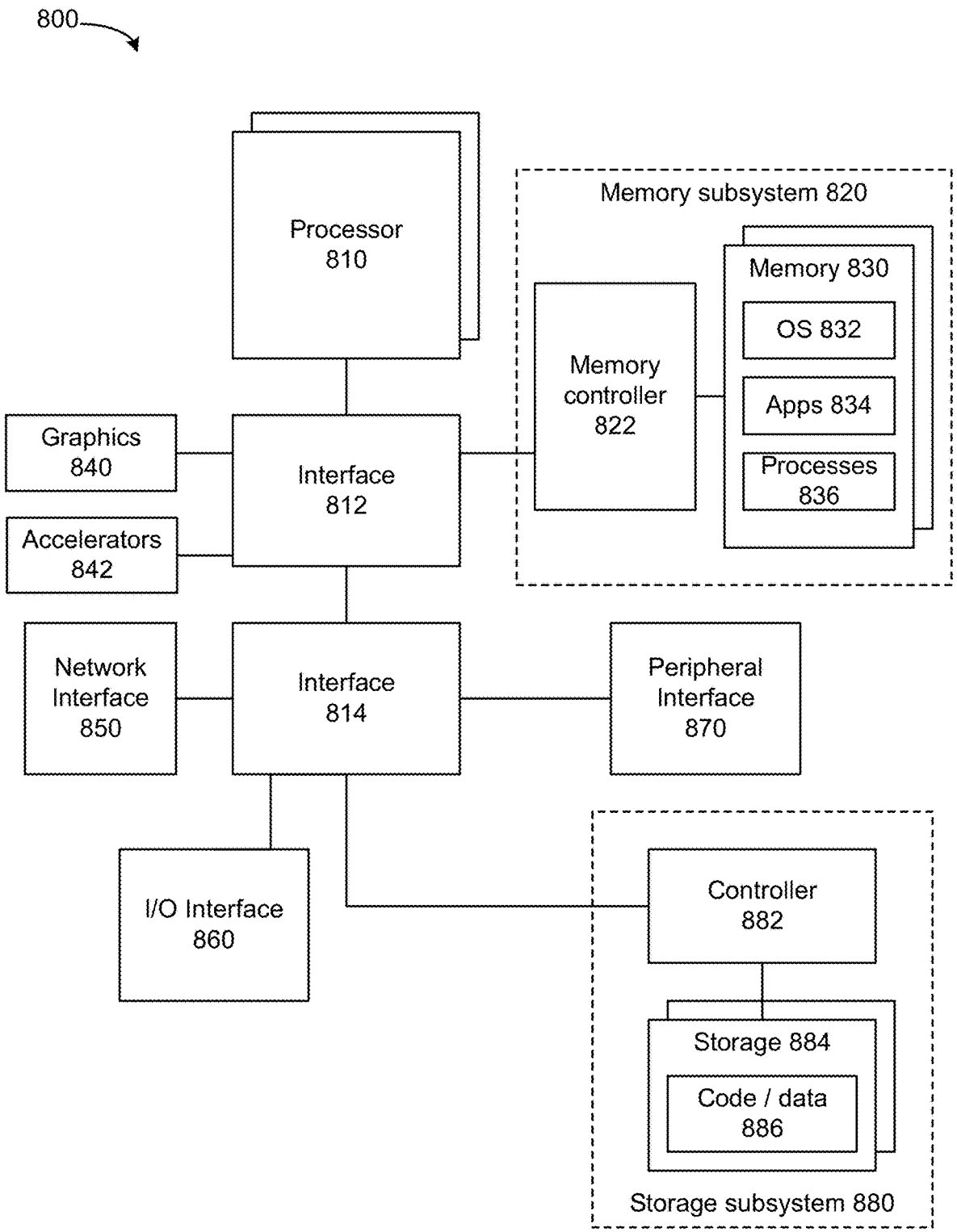
FIG. 8 depicts a system.

FIG. 8 depicts a system. The system can use embodiments described herein to provide data to or from the system to another device through a mesh or fabric. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 842 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory. Various embodiments can be used in connection with network interface 850, processor 810, and memory subsystem 820.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (i.e., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (i.e., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 9:
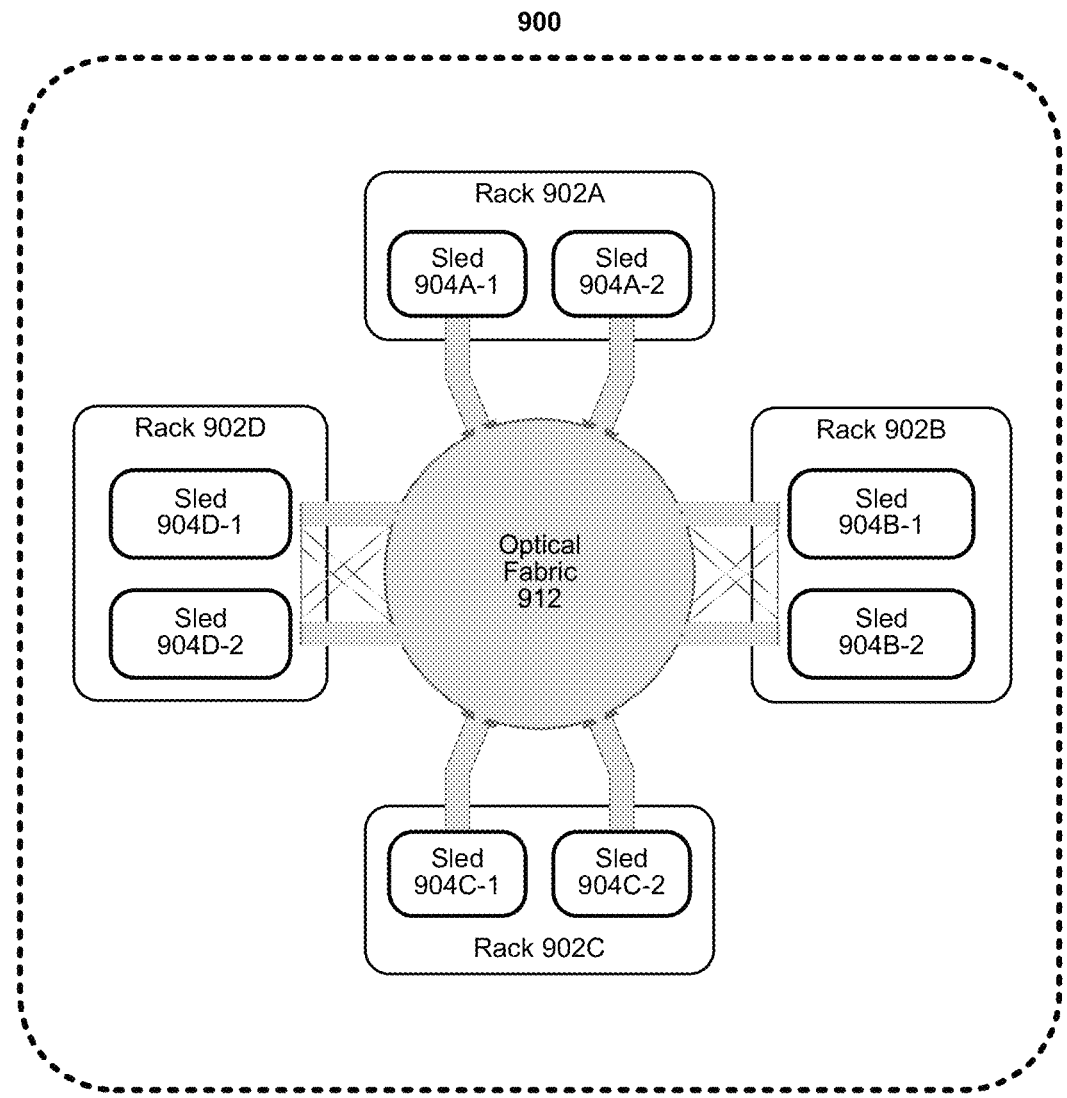
FIG. 9 depicts an example of a data center.

FIG. 9 depicts an example of a data center. As shown in FIG. 9, data center 900 may include an optical fabric 912. Various embodiments can be used in fabric 912. Optical fabric 912 may generally include a combination of optical signaling media (such as optical cabling) and optical switching infrastructure via which any particular sled in data center 900 can send signals to (and receive signals from) the other sleds in data center 900. The signaling connectivity that optical fabric 912 provides to any given sled may include connectivity both to other sleds in a same rack and sleds in other racks. Data center 900 includes four racks 902A to 902D and racks 902A to 902D house respective pairs of sleds 904A-1 and 904A-2, 904B-1 and 904B-2, 904C-1 and 904C-2, and 904D-1 and 904D-2. Thus, in this example, data center 900 includes a total of eight sleds. Optical fabric 912 can provide sled signaling connectivity with one or more of the seven other sleds. For example, via optical fabric 912, sled 904A-1 in rack 902A may possess signaling connectivity with sled 904A-2 in rack 902A, as well as the six other sleds 904B-1, 904B-2, 904C-1, 904C-2, 904D-1, and 904D-2 that are distributed among the other racks 902B, 902C, and 902D of data center 900. The embodiments are not limited to this example. For example, fabric 912 can provide optical and/or electrical signaling.

Figure 10:
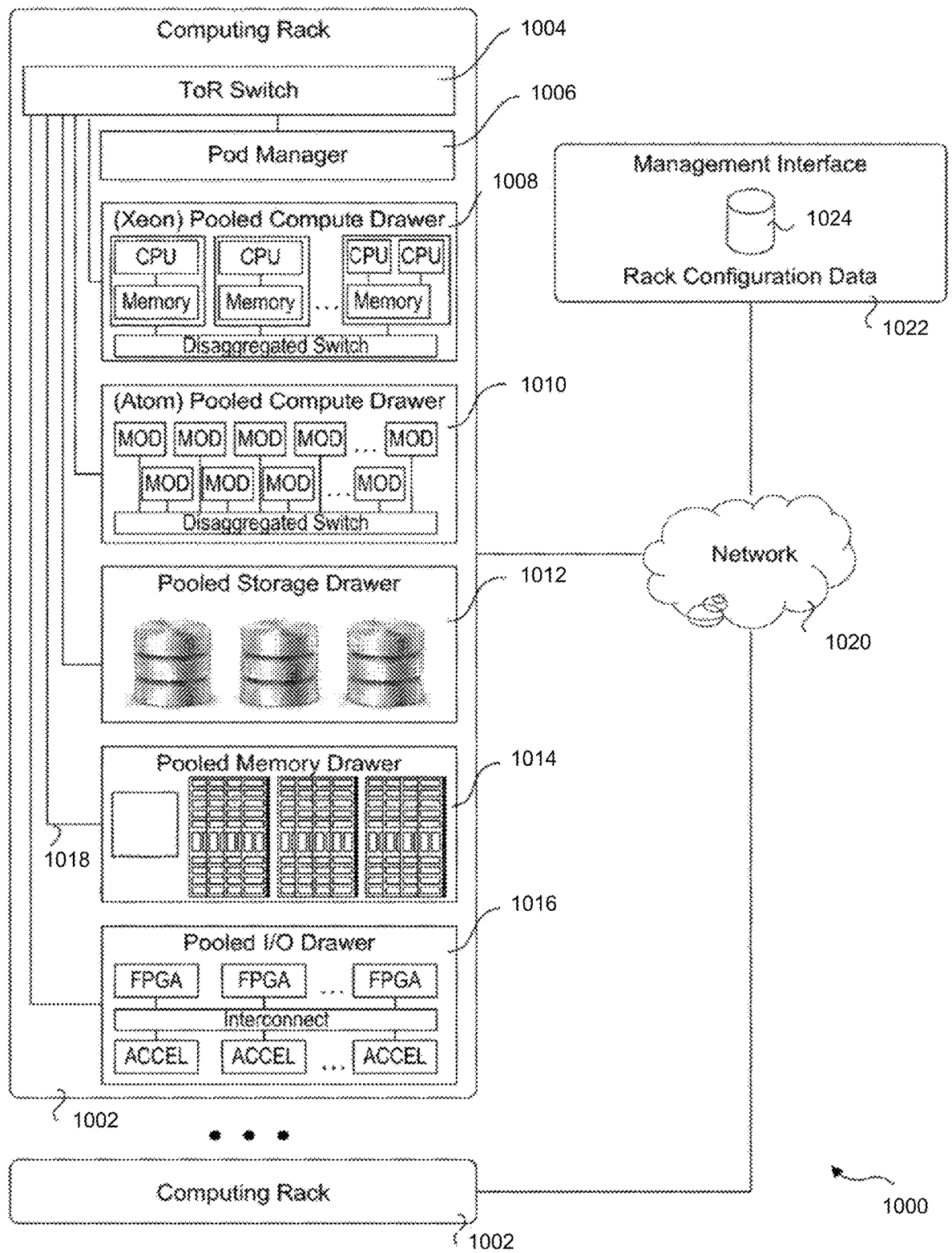
FIG. 10 depicts an example environment.

FIG. 10 depicts an environment 1000 includes multiple computing racks 1002, each including a Top of Rack (ToR) switch 1004, a pod manager 1006, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 1008, and INTEL® ATOM™ pooled compute drawer 1010, a pooled storage drawer 1012, a pooled memory drawer 1014, and a pooled I/O drawer 1016. Each of the pooled system drawers is connected to ToR switch 1004 via a high-speed link 1018, such as a 40 Gigabit/second (Gb/s) or 100 Gb/s Ethernet link or an 100+Gb/s Silicon Photonics (SiPh) optical link. In one embodiment high-speed link 1018 comprises an 800 Gb/s SiPh optical link.

Multiple of the computing racks 1000 may be interconnected via their ToR switches 1004 (e.g., to a pod-level switch or data center switch), as illustrated by connections to a network 1020. In some embodiments, groups of computing racks 1002 are managed as separate pods via pod manager(s) 1006. In one embodiment, a single pod manager is used to manage all of the racks in the pod. Alternatively, distributed pod managers may be used for pod management operations.

RSD environment 1000 further includes a management interface 1022 that is used to manage various aspects of the RSD environment. This includes managing rack configuration, with corresponding parameters stored as rack configuration data 1024.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a packet switching apparatus comprising: a first node and a second node connected to the first node, wherein the first node is to permit a first operation to continue to the second node in a same direction unless a second operation is available for transfer at the first node to the second node, wherein the first node is to select the second operation based on the second operation having a highest latency estimate and wherein the same direction comprises a north-south direction, south-north direction, east-west direction, or west-east direction.

Example 2 includes any example and includes a third node coupled to the first node and a memory device coupled to the first node, wherein the first node comprises a drop off router and a transmit queue, wherein either or both of the drop off router and the transmit queue is to sort operations to permit output of an operation with a highest latency estimate and wherein the first node is to: deliver the first operation to the memory device if the first operation has reached a destination memory device, deliver the first operation to the third node if the operation encounters a turning operation, or buffer the first operation in a queue if backpressure is applied by a node connected to the first node.

Example 3 includes any example, wherein the second node comprises a fast path target node and the third node comprises a non-fast path target node.

Example 4 includes any example, wherein the first node is to permit an operation to continue in a same direction if the transmit queue includes no operation.

Example 5 includes any example, wherein the first node is to provide separate credit for backpressure for unicast than for multicast operations.

Example 6 includes any example and includes a node cache and wherein an operation comprises a read response data that is written as one copy in the node cache and output using one or more reads from the node cache.

Example 7 includes any example and includes a multicast edge cache to provide a cache for a port to reduce re-requests for cached data.

Example 8 includes any example and includes a semaphore memory to store an indicator used to maintain read-after-write sequencing in a memory, wherein the indicator is to toggle after a write request and a read request is to proceed to completion based on the indicator being an expected value and if the indicator does not match an expected value, then commencement of the read request waits for the indicator to match the expected value.

Example 9 includes any example, wherein an operation comprises one or more of: a write request, write response, read request, read response, data, or a packet.

Example 10 includes any example and includes an egress subsystem to egress packets from the first node to a network.

Example 11 includes any example and includes a server, data center, rack, or blade.

Example 12 includes a method performed using a mesh, the method including:
 receiving an operation at a node; permitting an operation to pass through to another node if the operation is to proceed in a same direction and no contention is encountered; and causing buffering of the operation in a drop off router if contention is encountered, wherein contention comprises: the operation has reached a destination memory device, the operation encounters a turning operation, or backpressure is applied by another node connected to the node.

Example 13 includes any example and includes queueing one or more operations in a queue for transfer to another node and prioritizing output from the queue of an operation with highest latency estimate to another node.

Example 14 includes any example, wherein the latency estimate comprises: (time spent in mesh)+(minimum time to traverse remaining distance), wherein minimum time to traverse a remaining distance is defined as any function of a minimum possible time that an operation must remain in the mesh and wherein the minimum time to traverse remaining distance is a sum of all minimum hop delays along a path the operation will take.

Example 15 includes any example and includes using a semaphore indicator to maintain read-after-write sequencing in a memory, wherein the semaphore indicator is to toggle after a write request and a read request is to proceed to completion based on the semaphore indicator being an expected value.

Example 16 includes any example and includes providing separate credit for backpressure when a queue is filled for unicast operations than for multicast operations.

Example 17 includes any example, wherein an operation comprises one or more of: a write request, write response, read request, read response, data, or a packet.

Example 18 includes a system that includes at least one ingress port; a mesh; at least one egress port, wherein the mesh includes a first node; a second node coupled to the first node; a third node coupled to the first node; and a memory device coupled to the first node, wherein the first node comprises a drop off router to sort operations to permit output of an operation with a highest latency estimate and wherein the first node is to: permit pass-through to the second node of an operation that is to proceed in a same direction to a next node or cause buffering in a drop off router of the operation if contention is encountered, wherein contention comprises: the operation has reached a destination memory device, the operation encounters a turning operation, backpressure is applied by a node connected to the first node.

Example 19 includes any example, wherein the first node comprises a transmit queue to receive packets from the drop off router, the transmit queue to provide: output of an operation to the second node, output of an operation to the third node, or output to the memory device and wherein the transmit queue is to prioritize output of an operation with highest latency estimate to the second node or the third node.

Example 20 includes any example, wherein the first node is to provide separate credit for backpressure for unicast than for multicast operations.

Example 21 includes any example, and includes a node cache and wherein: an operation comprises a read response data that is written as one copy in the node cache and output using one or more reads from the node cache and a multicast edge cache to provide a cache for a port to reduce re-requests for cached data.

Example 22 includes any example, wherein an operation comprises one or more of: a write request, write response, read request, read response, data, or a packet.

What is claimed is:

1. A packet switching apparatus comprising:
a switch circuitry device comprising:
a memory mesh comprising multiple nodes and
circuitry to select a path through the multiple nodes of the switch circuitry for a first operation based on at least one latency estimate, wherein the multiple nodes comprise a first node and a second node,
wherein the first node is to permit the first operation to continue to the second node in a same direction unless a second operation is available for transfer at the first node to the second node, wherein the first node is to select the second operation based on the second operation having a highest latency estimate and wherein the same direction comprises a north-south direction, south-north direction, east-west direction, or west-east direction within the switch circuitry device.

2. The apparatus of claim 1, wherein the switch circuitry device comprises:
a third node, of the multiple nodes, coupled to the first node and
a memory device coupled to the first node, wherein the first node comprises a drop off router and a transmit queue, wherein either or both of the drop off router and the transmit queue is to sort operations to permit output of an operation with a highest latency estimate and wherein the first node is to:
deliver the first operation to the memory device if the first operation has reached a destination memory device,
deliver the first operation to the third node if the operation encounters a turning operation, or
buffer the first operation in a queue if backpressure is applied by a node connected to the first node.

3. The apparatus of claim 2, wherein:
the second node comprises a fast path target node and
the third node comprises a non-fast path target node.

4. The apparatus of claim 2, wherein the first node is to permit an operation to continue in a same direction if the transmit queue includes no operation.

5. The apparatus of claim 2, wherein the first node is to provide separate credit for backpressure for unicast than for multicast operations.

6. The apparatus of claim 1, wherein the switch circuitry device comprises a node cache and wherein an operation comprises a read response data that is written as one copy in the node cache and output using one or more reads from the node cache.

7. The apparatus of claim 1, wherein the switch circuitry device comprises a multicast edge cache to provide a cache for a port to reduce re-requests for cached data.

8. The apparatus of claim 1, wherein the switch circuitry device comprises a semaphore memory to store an indicator used to maintain read-after-write sequencing in a memory, wherein the indicator is to toggle after a write request and a read request is to proceed to completion based on the indicator being an expected value and if the indicator does not match an expected value, then commencement of the read request waits for the indicator to match the expected value.

9. The apparatus of claim 1, wherein an operation comprises one or more of: a write request, write response, read request, read response, data, or a packet.

10. The apparatus of claim 1, wherein the switch circuitry device comprises an egress subsystem to egress packets from the first node to a network.

11. The apparatus of claim 1, a server, data center, rack, or blade.

12. A method comprising:
in a switch a mesh of multiple nodes:
receiving an operation at a node of the multiple nodes wherein a path of the operation through the multiple nodes is based on at least one latency estimate;
permitting an operation to pass through to another node of the multiple nodes if the operation is to proceed in a same direction and no contention is encountered; and
causing buffering of the operation in a drop off router if contention is encountered, wherein contention comprises:
the operation has reached a destination memory device,
the operation encounters a turning operation, or
backpressure is applied by another node connected to the node.

13. The method of claim 12, comprising:
in the switch:
queueing one or more operations in a queue for transfer to another node of the multiple nodes and
prioritizing output from the queue of an operation with a highest latency estimate to another node of the multiple nodes.

14. The method of claim 13, wherein the latency estimate comprises: (time spent in the mesh)+(minimum time to traverse remaining distance), wherein minimum time to traverse a remaining distance is defined as any function of a minimum possible time that an operation must remain in the mesh and wherein the minimum time to traverse remaining distance is a sum of all minimum hop delays along a path the operation will take.

15. The method of claim 12, comprising:
in the switch:
using a semaphore indicator to maintain read-after-write sequencing in a memory, wherein the semaphore indicator is to toggle after a write request and a read request is to proceed to completion based on the semaphore indicator being an expected value.

16. The method of claim 12, comprising:
in the switch:
providing separate credit for backpressure when a queue is filled for unicast operations than for multicast operations.

17. The method of claim 12, wherein an operation comprises one or more of: a write request, write response, read request, read response, data, or a packet.

18. A system comprising:
a switch comprising:
at least one ingress port;
a mesh;
at least one egress port, wherein the mesh comprises:
a first node;
a second node coupled to the first node;
a third node coupled to the first node; and
a memory device coupled to the first node, wherein
a path of an operation through multiple nodes of the mesh is based on at least one latency estimate, wherein the first node is to:
permit pass-through to the second node of the operation based on the operation is to proceed in a same direction to a next node or
cause buffering in a drop off router of the operation if contention is encountered, wherein contention comprises:
the operation has reached a destination memory device,
the operation encounters a turning operation,
backpressure is applied by a node connected to the first node.

19. The system of claim 18, wherein the first node comprises a transmit queue to receive packets from the drop off router, the transmit queue to provide:
output of an operation to the second node,
output of an operation to the third node, or
output to the memory device and wherein the transmit queue is to prioritize output of an operation with a highest latency estimate to the second node or the third node.

20. The system of claim 18, wherein the first node is to provide separate credit for backpressure for unicast than for multicast operations.

21. The system of claim 18, a node cache and wherein:
an operation comprises a read response data that is written as one copy in the node cache and output using one or more reads from the node cache and
a multicast edge cache to provide a cache for a port to reduce re-requests for cached data.

22. The system of claim 18, wherein an operation comprises one or more of: a write request, write response, read request, read response, data, or a packet.

* * * * *

UNITED STATES PATENT AND TRADEMARK OFFICE
CERTIFICATE OF CORRECTION

PATENT NO. : 11,641,326 B2
APPLICATION NO. : 16/549915
DATED : May 2, 2023
INVENTOR(S) : Karl S. Papadantonakis et al.

It is certified that error appears in the above-identified patent and that said Letters Patent is hereby corrected as shown below:

In the Claims

Column 23, Line 12-27, Claim 1 Should read:
A packet switching apparatus comprising:
    a switch circuitry device comprising:
    a memory mesh comprising multiple nodes and
    circuitry to select a path through the multiple nodes of the switch circuitry device for a
first operation based on at least one latency estimate, wherein the multiple nodes comprise a first node
and a second node, wherein the first node is to permit the first operation to continue to the second node
in a same direction unless a second operation is available for transfer at the first node to the second
node, wherein the first node is to select the second operation based on the second operation having a
highest latency estimate and wherein the same direction comprises a north-south direction, south-north
direction, east-west direction, or west-east direction within the switch circuitry device.

Column 24, Line 12-27, Claim 12 Should read:
A method comprising:
    in a switch comprising a mesh of multiple nodes:
    receiving an operation at a node of the multiple nodes wherein a path of the operation
through the multiple nodes is based on at least one latency estimate;
    permitting an operation to pass through to another node of the multiple nodes if the operation
is to proceed in a same direction and no contention is encountered; and
    causing buffering of the operation in a drop off router if contention is encountered, wherein
contention comprises:
        the operation has reached a destination memory device,
        the operation encounters a turning operation, or
        backpressure is applied by another node connected to the node.

Column 26, Line 8-13, Claim 21 Should read:
The system of claim 18, comprising a node cache and wherein:
    an operation comprises a read response data that is written as one copy in the node cache and Signed and Sealed this
Seventeenth Day of October, 2023

*Katherine Kelly Vidal*

Katherine Kelly Vidal
*Director of the United States Patent and Trademark Office* output using one or more reads from the node cache and
a multicast edge cache to provide a cache for a port to reduce re-requests for cached data.